MULTIPLE UNIT TRAILERS AND CONTAINERS

Filed May 17, 1961 14 Sheets-Sheet 1

INVENTORS.
WALTER BENNETT,
STEPHEN BARKER,
PERCIVAL M. HEINMILLER,
By Beckelew & Lewis

MULTIPLE UNIT TRAILERS AND CONTAINERS

Filed May 17, 1961 14 Sheets-Sheet 2

INVENTORS
WALTER BENNETT,
STEPHEN BARKER,
PERCIVAL M. HEINMILLER,
By Barkelew & Lewis INVENTORS.
WALTER BENNETT,
STEPHEN BARKER,
PERCIVAL M. HEINMILLER,
BY Berkelew & Lewis

MULTIPLE UNIT TRAILERS AND CONTAINERS

Filed May 17, 1961

14 Sheets-Sheet 4

INVENTORS.
WALTER BENNETT,
STEPHEN BARKER,
PERCIVAL M. HEINMILLER,

By Barkelew & Lewis

MULTIPLE UNIT TRAILERS AND CONTAINERS

INVENTORS.
WALTER BENNETT,
STEPHEN BARKER,
PERCIVAL M. HEINMILLER,
By Berkelew & Lewis

MULTIPLE UNIT TRAILERS AND CONTAINERS

Filed May 17, 1961 14 Sheets-Sheet 6

WALTER BENNETT,
STEPHEN BARKER,
PERCIVAL M. HEINMILLER,
INVENTORS.

BY Barkelew & Lewis

WALTER BENNETT,
STEPHEN BARKER,
PERCIVAL M. HEINMILLER,
INVENTORS.
BY Berkelew & Lewis

MULTIPLE UNIT TRAILERS AND CONTAINERS

Filed May 17, 1961 14 Sheets-Sheet 8

WALTER BENNETT
STEPHEN BARKER,
PERCIVAL M. HEINMILLER,
INVENTORS.

BY
Barkelew & Lewis

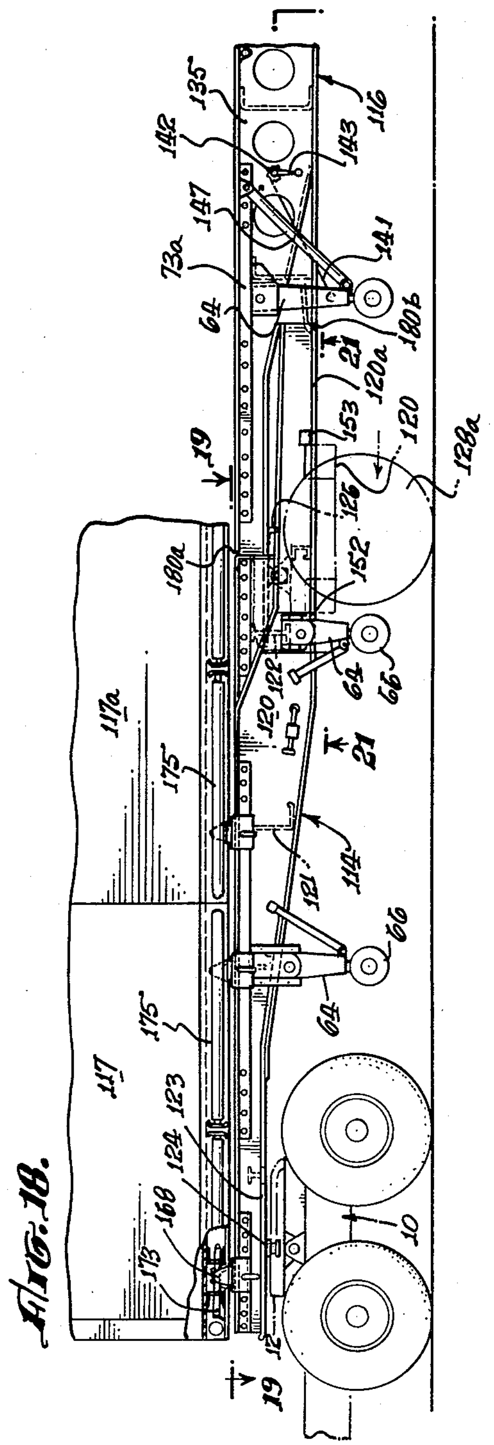
FIG. 18.
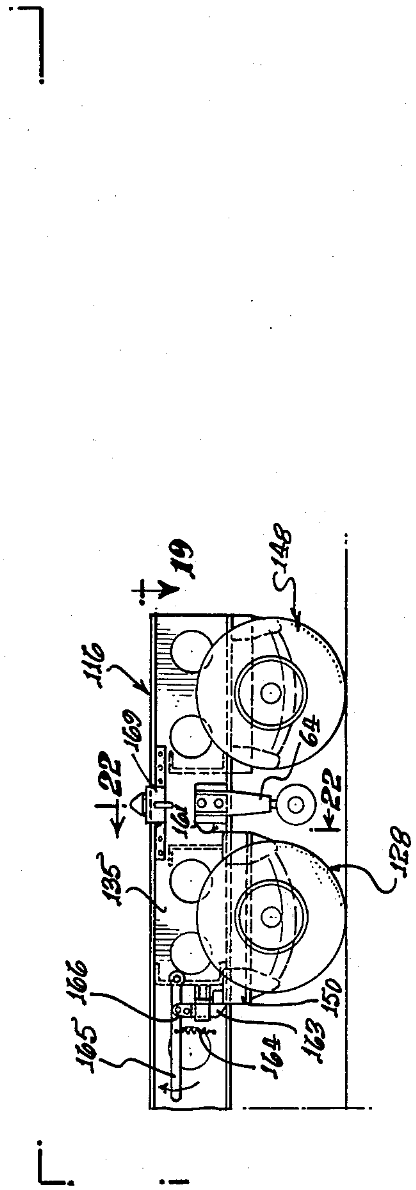
WALTER BENNETT,
STEPHEN BARKER,
PERCIVAL M. HEINMILLER,
INVENTORS
BY
Barkelew & Lewis

WALTER BENNETT,
STEPHEN BARKER,
PERCIVAL M. HEINMILLER,
INVENTORS.

BY
Barkelew & Lewis

WALTER BENNETT,
STEPHEN BARKER,
PERCIVAL M. HEINMILLER,
INVENTORS.

BY

Barkelew & Lewis

MULTIPLE UNIT TRAILERS AND CONTAINERS

Filed May 17, 1961 14 Sheets-Sheet 12

WALTER BENNETT,
STEPHEN BARKER,
PERCIVAL M. HEINMILLER,
INVENTORS

BY
Barkelew & Lewis

Dec. 29, 1964 W. BENNETT ETAL 3,163,306

MULTIPLE UNIT TRAILERS AND CONTAINERS

Filed May 17, 1961 14 Sheets-Sheet 13

INVENTORS.
WALTER BENNETT,
STEPHEN BARKER,
PERCIVAL M. HEINMILLER,

By. Barkelew & Lewis

MULTIPLE UNIT TRAILERS AND CONTAINERS

Filed May 17, 1961

14 Sheets-Sheet 14

INVENTORS.
WALTER BENNETT,
STEPHEN BARKER,
PERCIVAL M. HEINMILLER,
By Bakelaw & Lewis United States Patent Office 3,163,306

Patented Dec. 29, 1964

3,163,306

MULTIPLE UNIT TRAILERS AND CONTAINERS

Walter Bennett, San Marino, Stephen Barker, Temple City, and Percival M. Heinmiller, Pasadena, Calif., assignors to Utility Trailer Manufacturing Company, City of Industry, Calif., a corporation of California Filed May 17, 1961, Ser. No. 110,755
23 Claims. (Cl. 214—515)

The present invention relates generally to what may be termed composite trailers and/or containers; and is characterized generally by multiple semi-trailer units that may be used either separately or coupled together to form either a single composite semi-trailer or a series of semi-trailers; and registered containers which are moved into coupling registration when semi-trailer units are coupled to form a composite semi-trailer. It is one of the features of the invention that the semi-trailer units are framed independently of the containers, the container framing forming no necessary part of the trailer framing. The trailer or trailer-frame units may thus be used either independently of the containers, or co-operatively with containers registered on them for coupling registration. And it is also a characteristic of the invention that the containers, singly or doubled, may be used and handled independently of the trailer units; the invention also including a container coupling system that may be used independently of the trailer units for coupling containers together to be handled as a single unit.

Although the invention, as will become apparent, may involve more than two coupleable trailer or trailer-frame units, and containers, it will here be described in typical and illustrative form involving two units, but without limitation thereto. For descriptive purposes those two units will be referred to as forward and rear units.

In typical and preferred form, each trailer unit, adequately framed, has a rear running gear, a forward fifth wheel member including a king-pin, and a forward support, so that each may be used separately behind a tractor truck. The several units have engaging formations which, upon coupling, form the several units into a single composite trailer with a rigid composite frame. The rear running gear of the forward unit is then moved out of contact with the roadway under that unit. In one form to be described that movement of that running gear is effected by raising the forward end of the front unit on the tractor; in another form, by shifting that running gear rearwardly to a position under the unit that is to the rear.

In typical and preferred form the forward unit also carries at its rear end a fifth wheel member similar to that on the tractor. The forward fifth wheel member on the rearward unit may be towed behind the forward unit. And when the two units are rigidly coupled by inter-engagement of longitudinally over-lapping parts, locking of the rear unit king-pin in that rear fifth wheel member locks the two units together longitudinally.

The inter-locked composite trailer may be used for carrying any desired load; but an additional feature of the invention involves containers so registered on the several trailer or trailer-frame units that when the units are rigidly coupled, the several containers are moved into end-to-end coupling registration. Two or more such coupled containers may then be transferred from one carrier to another as a single unit. That, for instance, may be done by lifting tackle; or, as described below, by running the composite trailer frame out from under the then independently supported composite container unit and running another carrier under the container units.

Various other preferred features of the invention will be best understood from the following descriptions of the typical and illustrative forms shown in the accompanying drawings in which.

Figure 4:
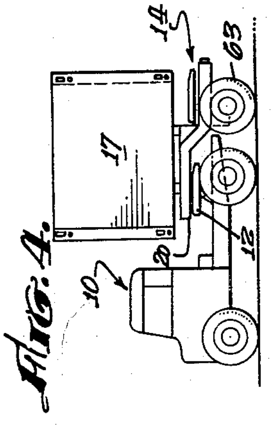
Figure 3:
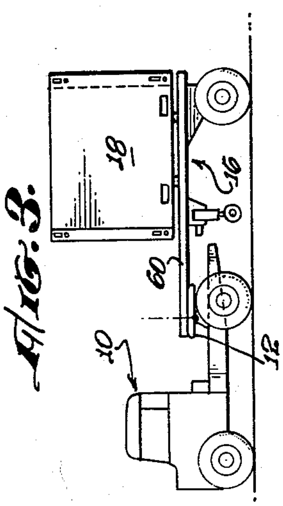
Figure 4A:
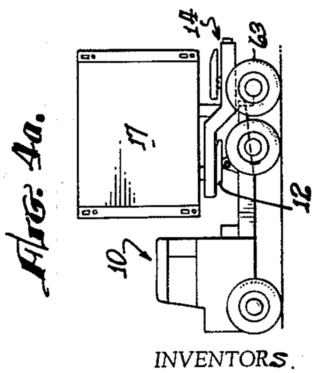

FIGS. 3, 4 and 4*a* are schematic side elevations illustrating respectively a rear semi-trailer unit and a forward semi-trailer unit connected to the tractor for towing.

Figure 5:
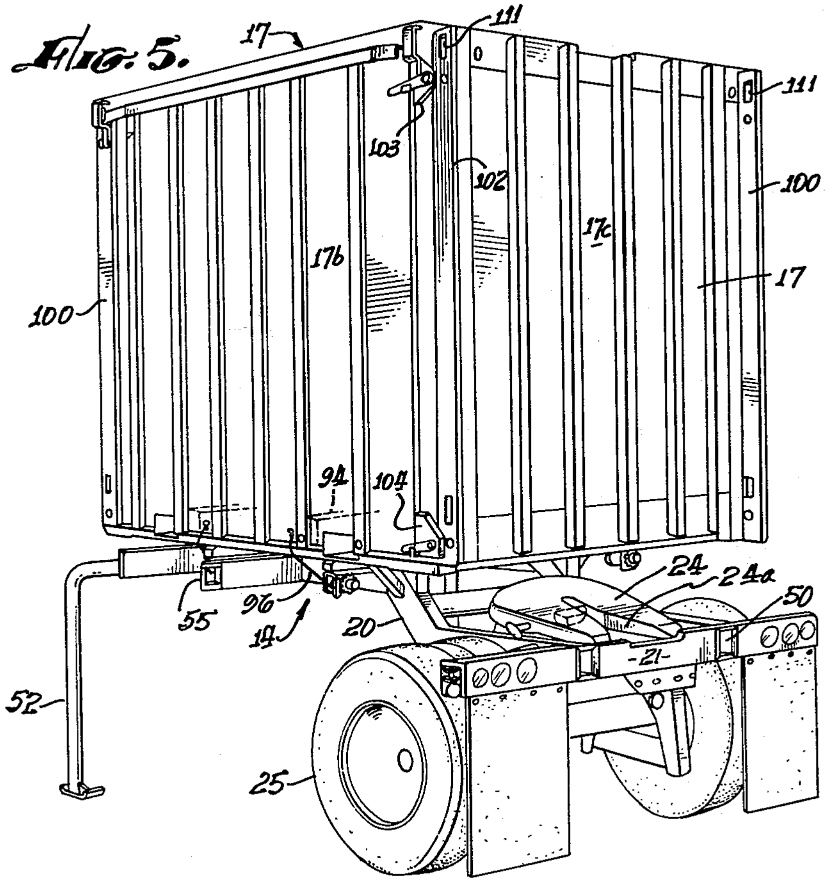

FIG. 5 is a perspective viewed from the rear of the forward semi-trailer unit detached from the tractor, the forward support legs being lowered into supporting position.

Figure 2:
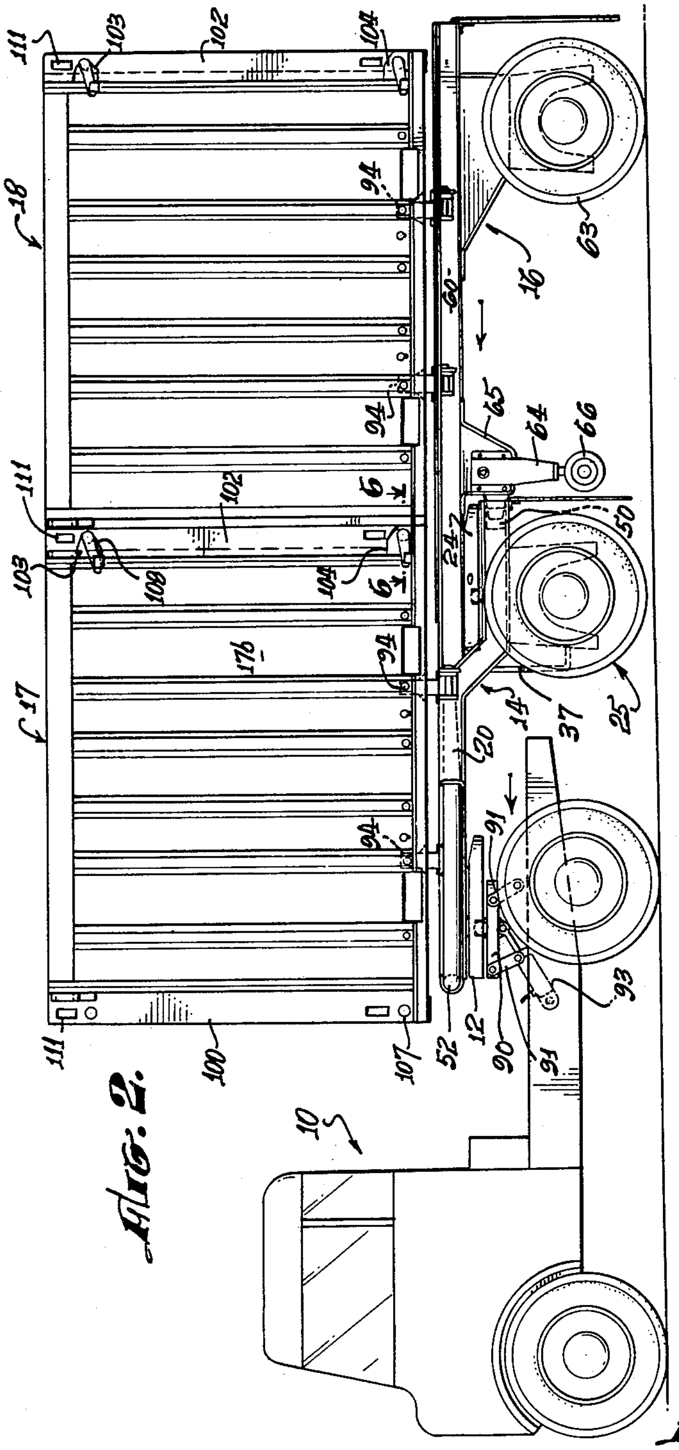
FIG. 2 is a side elevation similar to FIG. 1 showing the frames, and the containers thereon, of the two semi-trailer units interlocked to form a single composite semi-trailer and composite container towed by the tractor.
Figure 6:
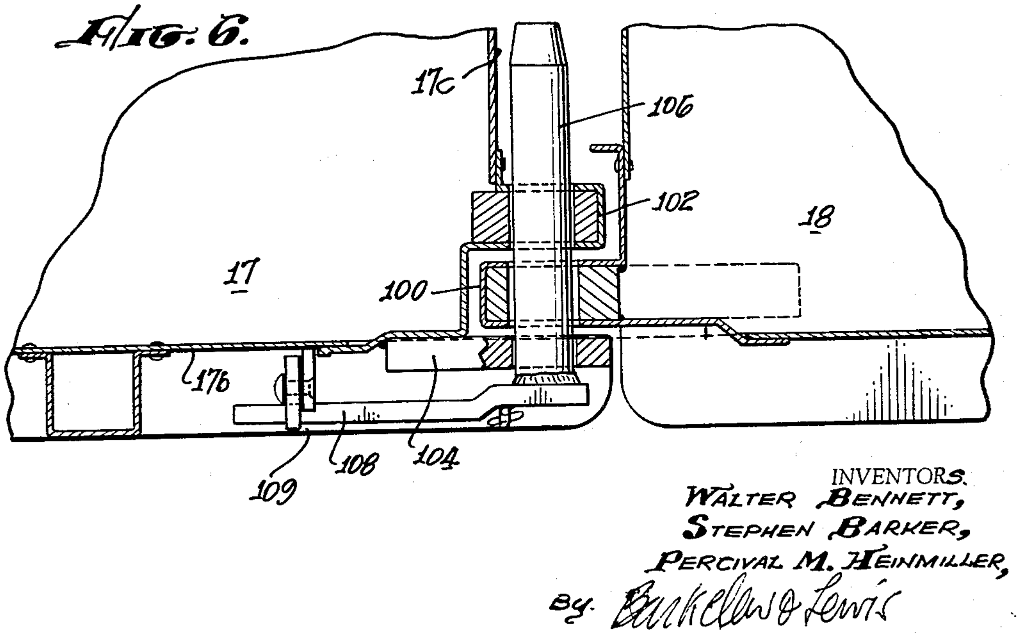

FIG. 6 is an enlarged fragmentary horizontal section on line 6—6 of FIG. 2 illustrating the interfitting and connection of the containers.

Figure 7:
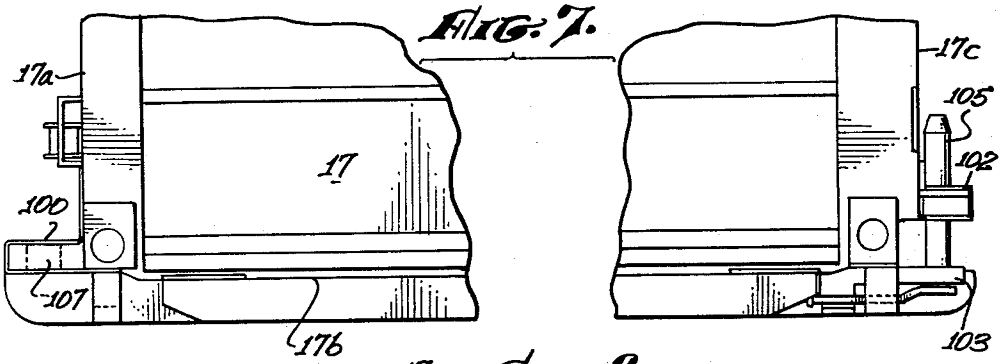

FIG. 7 is an enlarged fragmentary plan view illustrating corner portions of one of the freight containers carried on the semi-trailer units.

Figure 8:
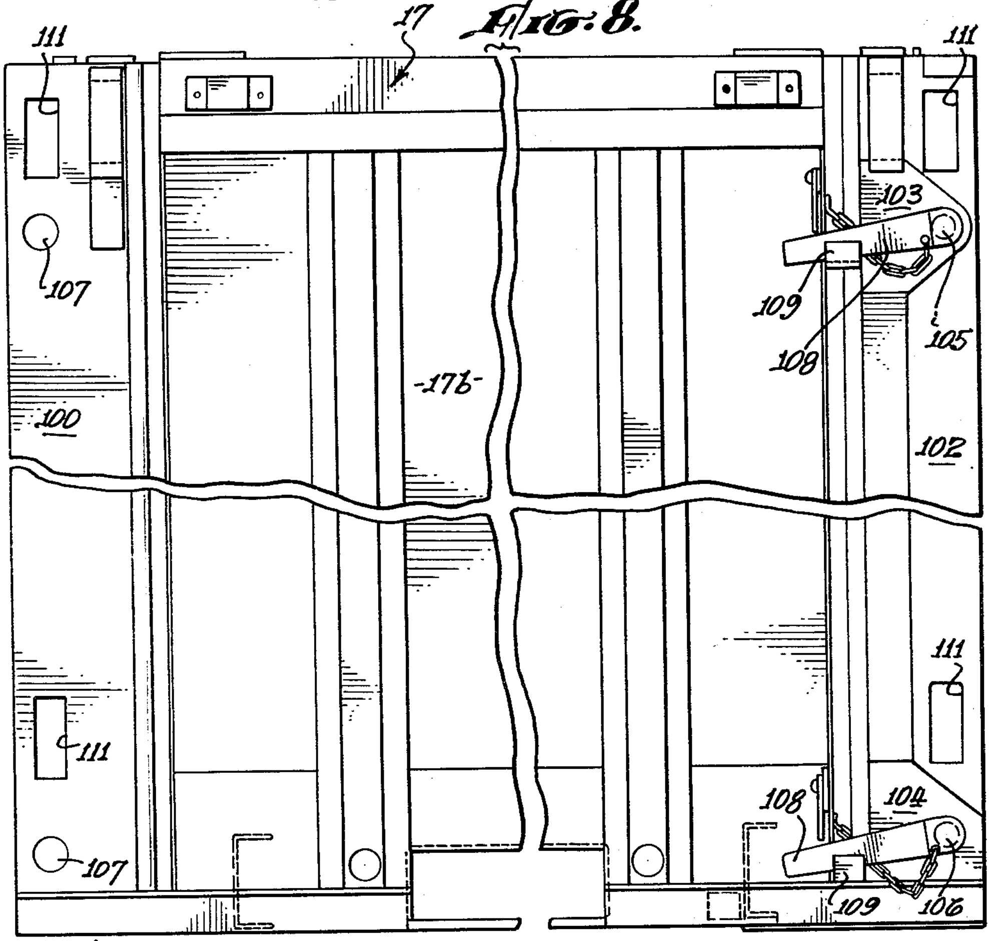

FIG. 8 is an enlarged fragmentary side elevation of one of the freight containers carried on the semi-trailer units.

Figure 8A:
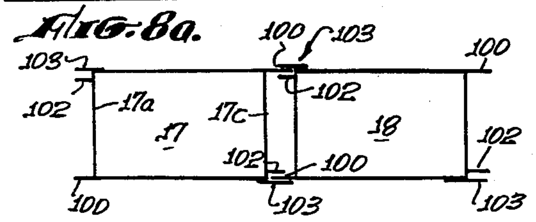

FIG. 8*a* is a schematic plan of two containers in interlocking position.

Figure 1:
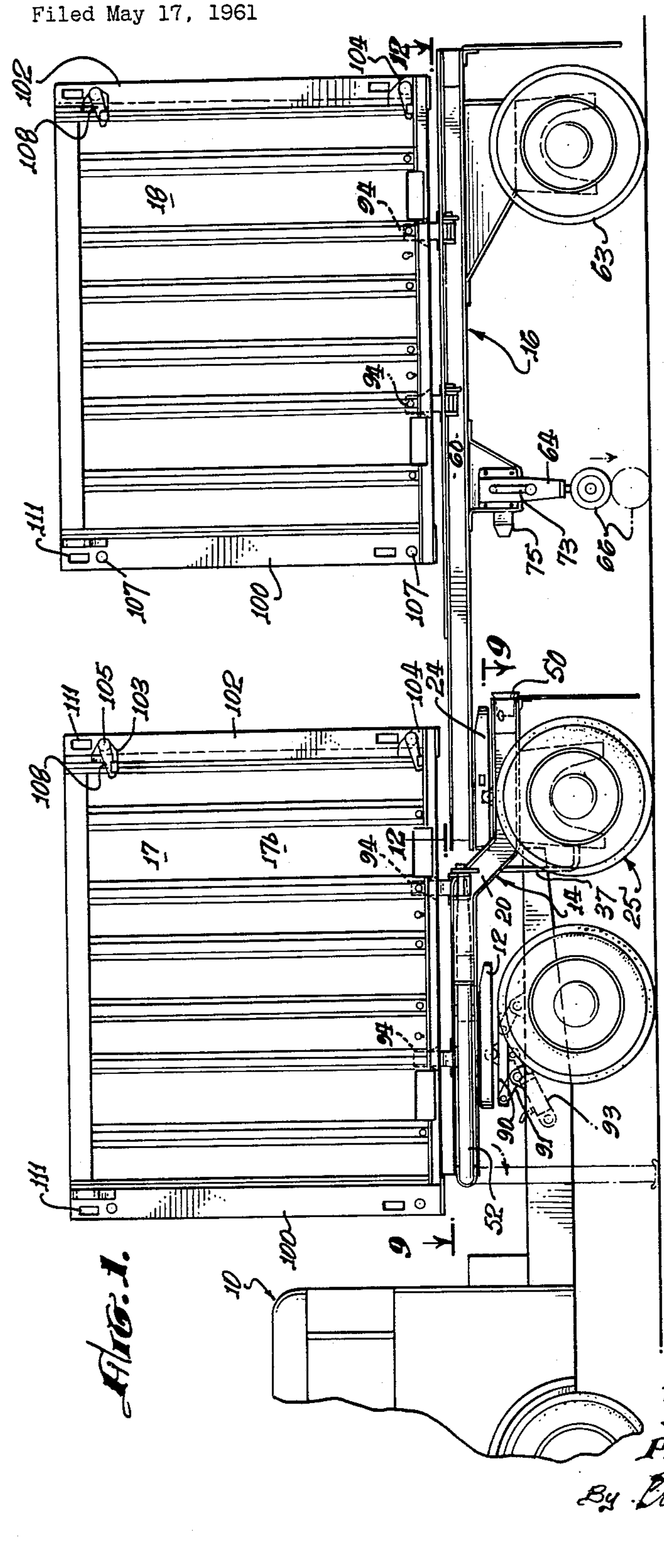
FIG. 1 is a side elevation of a tractor towing forward and rear semi-trailer units connected in series without their frames being interlocked.
Figures 9, 10, 11:
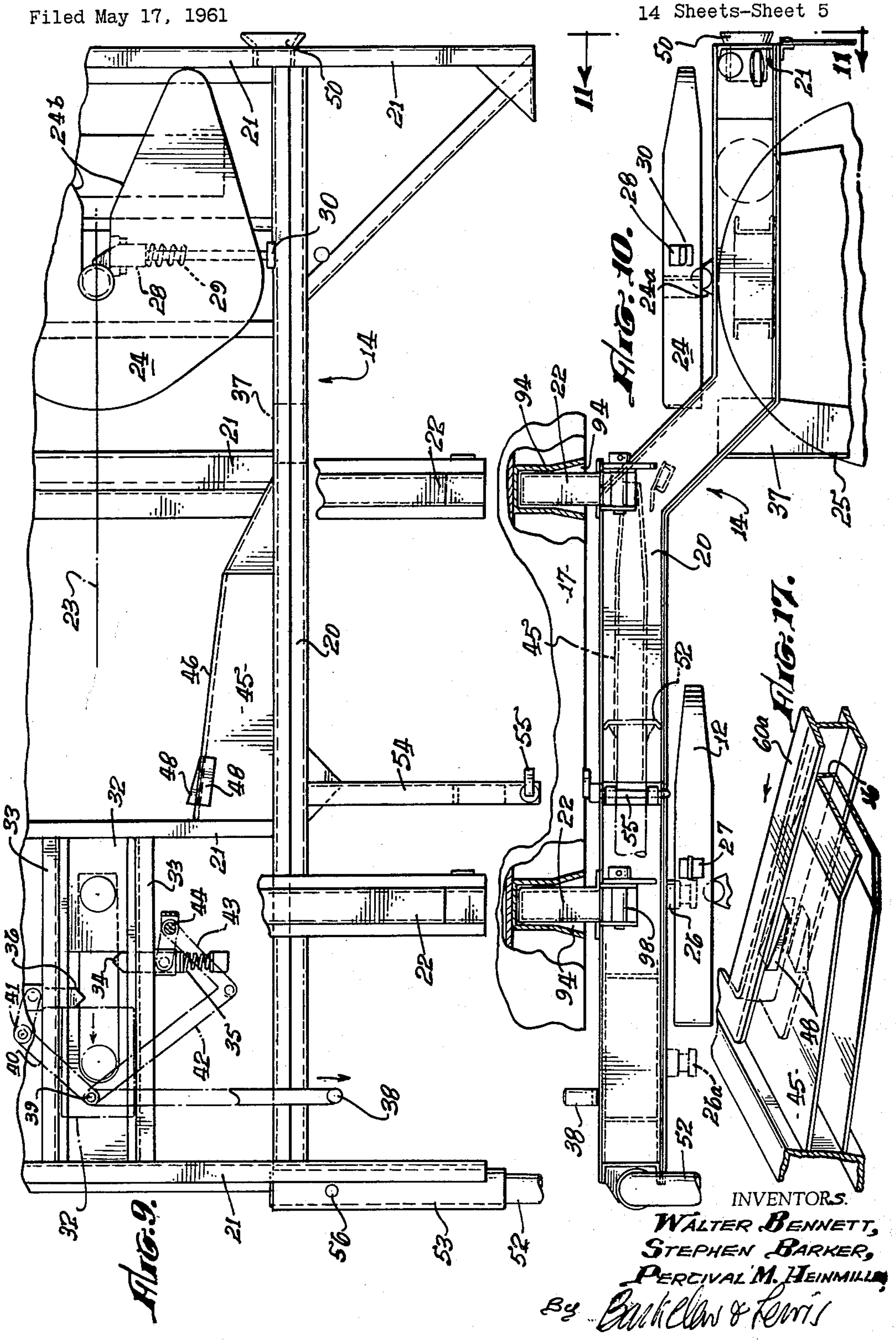
Figure 11:
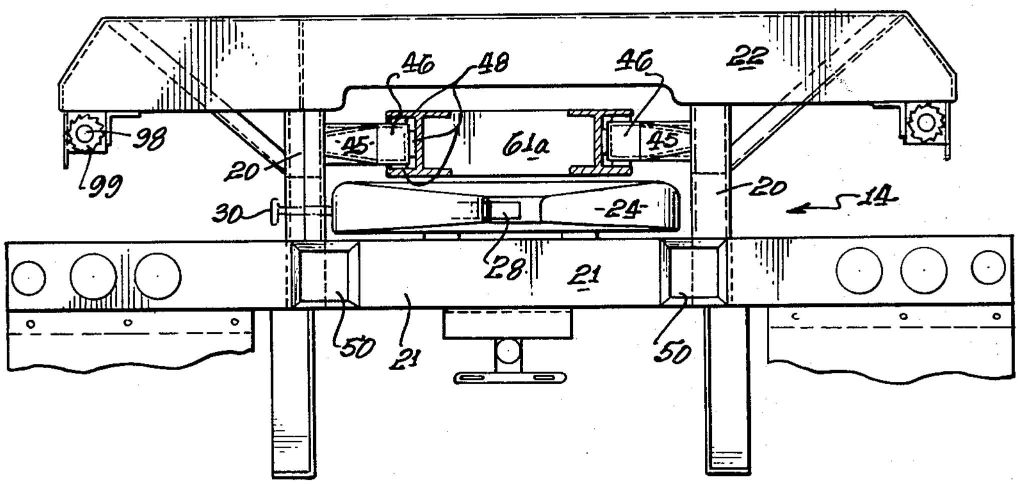

FIG. 9 is an enlarged fragmentary plan of the frame of the forward semi-trailer unit taken on line 9—9 of FIG. 1.

FIG. 10 is a side elevation of the frame of the forward semi-trailer illustrated in FIG. 9.

FIG. 11 is a rear elevation of the frame of the forward semi-trailer unit taken on line 11—11 of FIG. 10.

Figure 16:
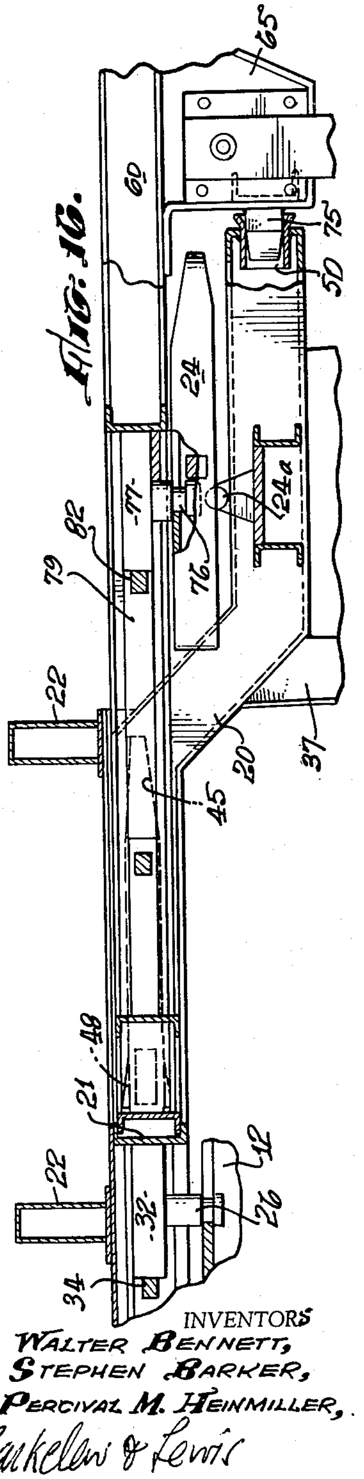
Figure 12:
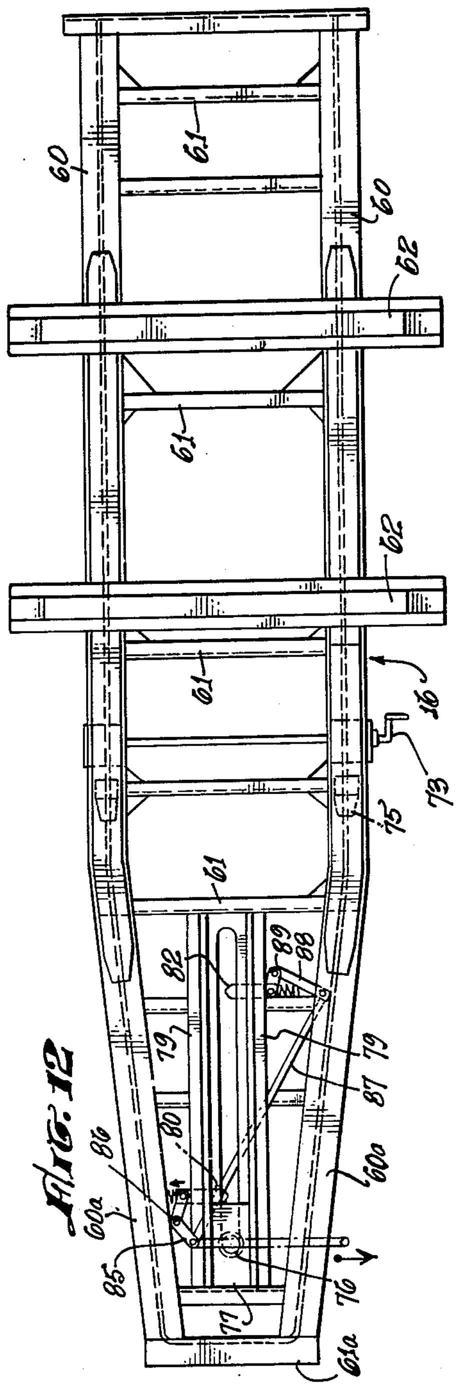
Figure 16A:
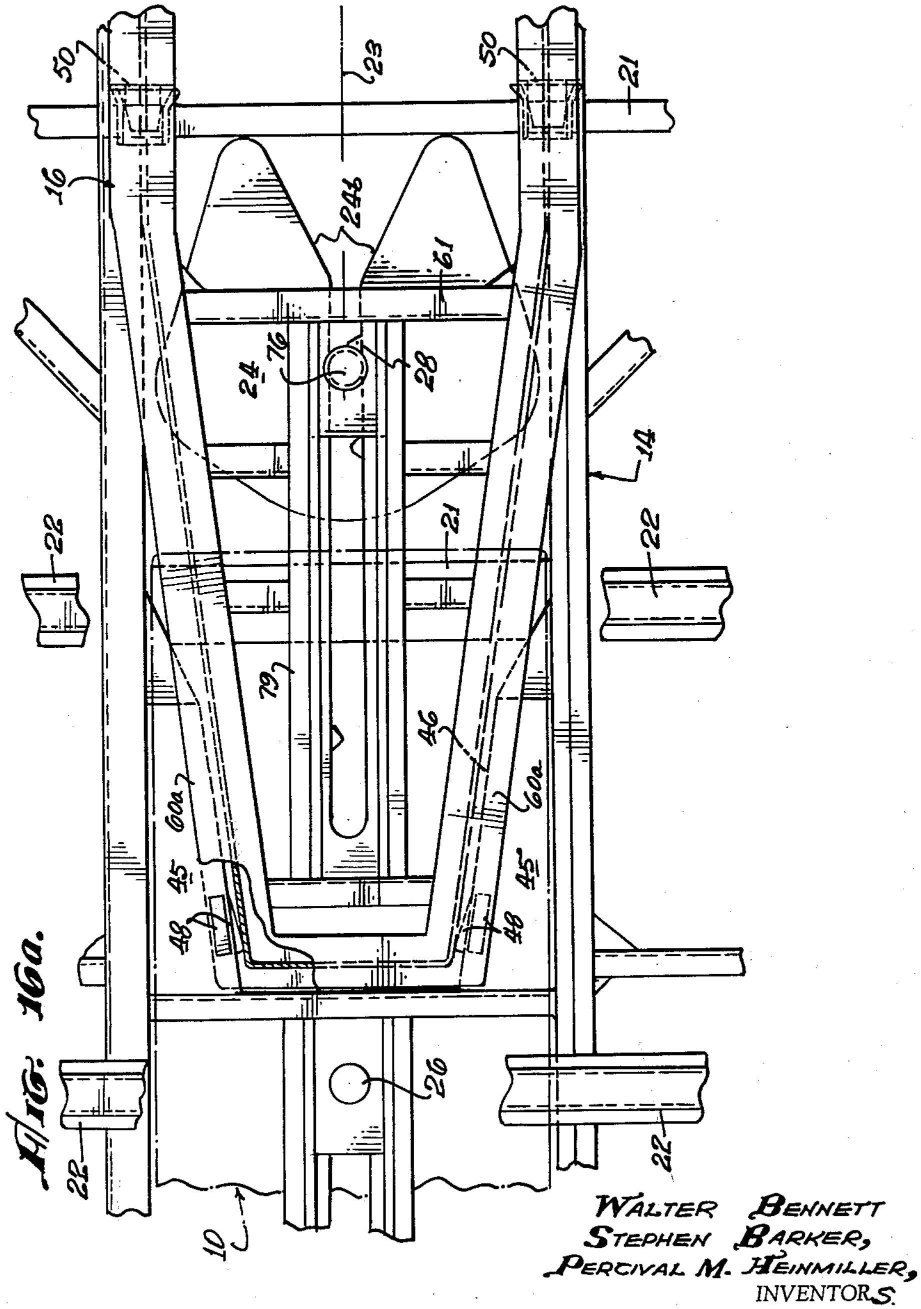

FIG. 12 is an enlarged plan on a scale somewhat smaller than that of FIG. 9, of the frame of the rear semi-trailer unit taken on line 12—12 of FIG. 1. FIGS. 16 and 16*a* show parts of the two frames at the same scale.

Figure 13:
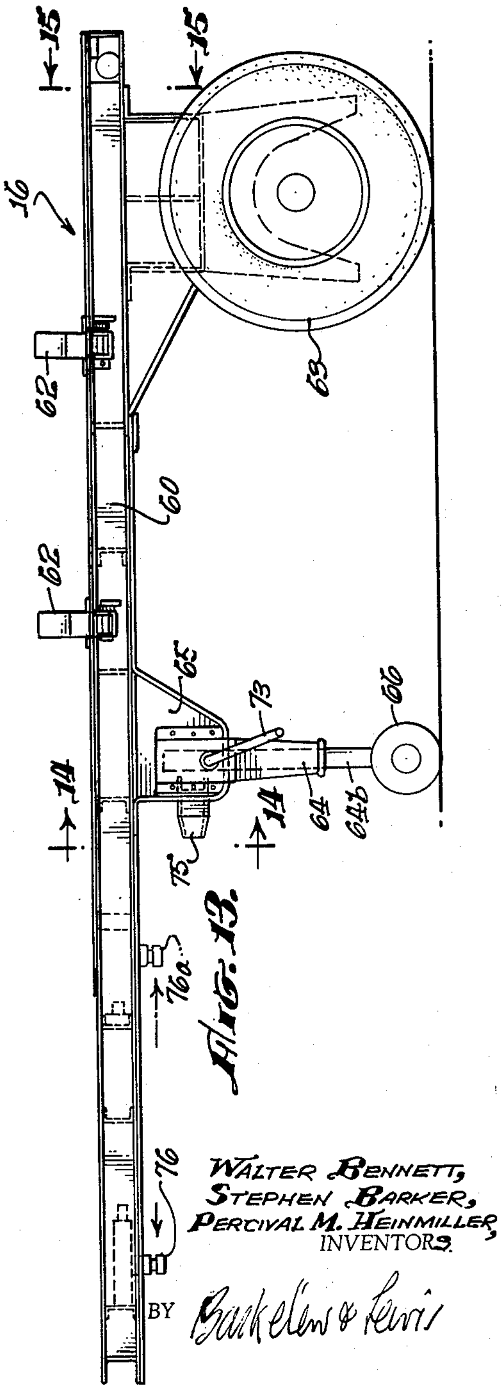

FIG. 13 is a side elevation of the rear semi-trailer unit illustrated in FIG. 12.

Figures 14, 15:
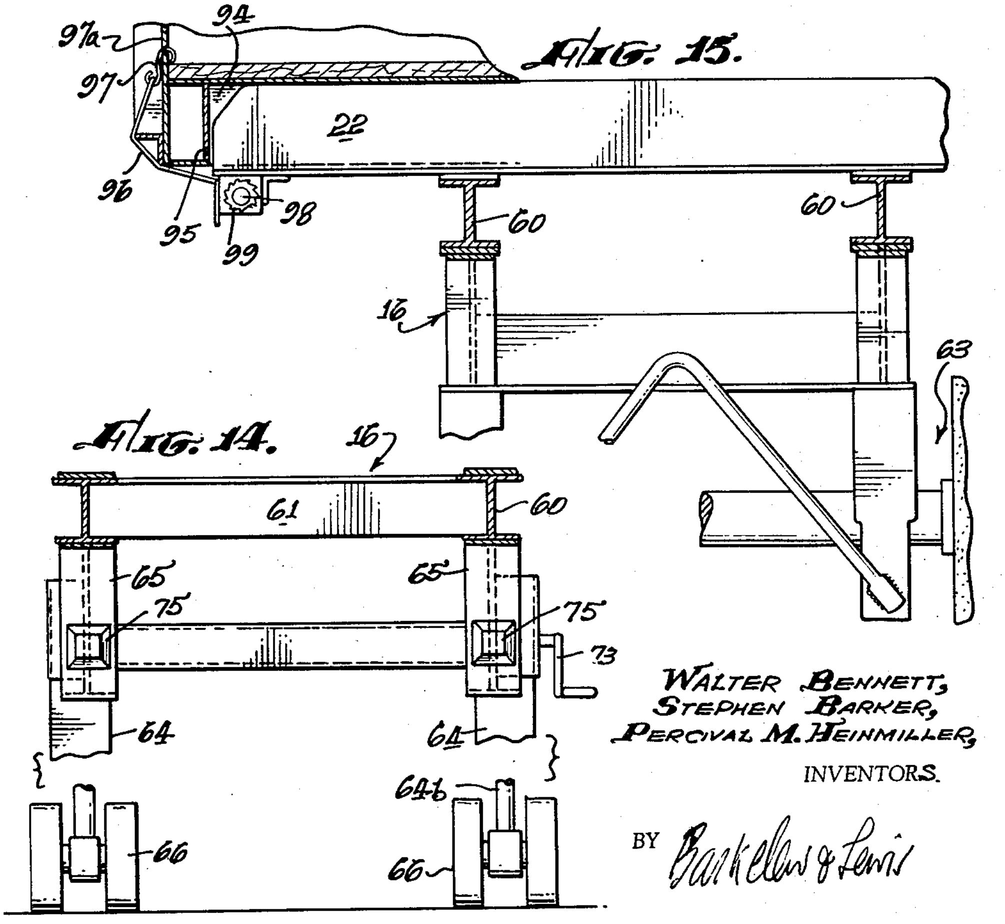

FIG. 14 is a combined fragmentary elevation and vertical section taken on line 14—14 of FIG. 13, showing the interlocking elements on the rear semi-trailer.

FIG. 15 is a fragmentary vertical section on line 15—15 of FIG. 13.

FIG. 16 is an enlarged combined elevation and fragmentary vertical section through overlapping portions of the frame of the two semi-trailer units when interlocked as in FIG. 2 to form a single composite semi-trailer.

FIG. 16*a* is a plan of the overlapping parts shown in FIG. 16.

FIG. 17 is a fragmentary perspective of overlapping portions of the two trailer frames illustrating wedge means for securing a tight fit in registration.

FIG. 18 is a side elevation of a second form of the invention, with two semi-trailer units interlocked to form a single composite semi-trailer.

Figure 19:
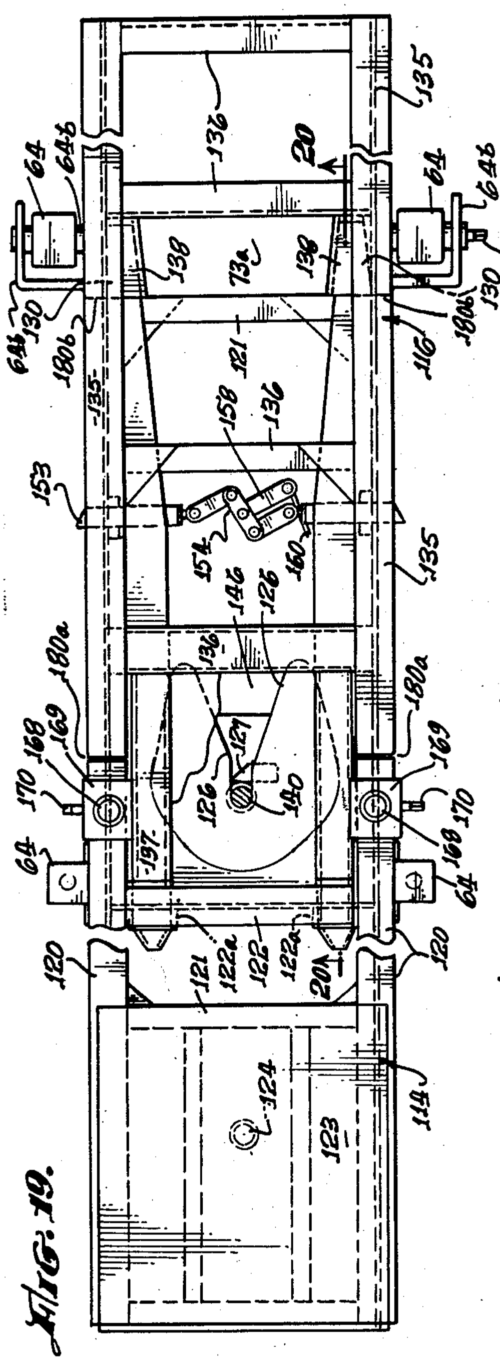

FIG. 19 is a fragmentary plan view on line 19—19 of FIG. 18 of the two interlocked semi-trailer frames.

Figure 20:
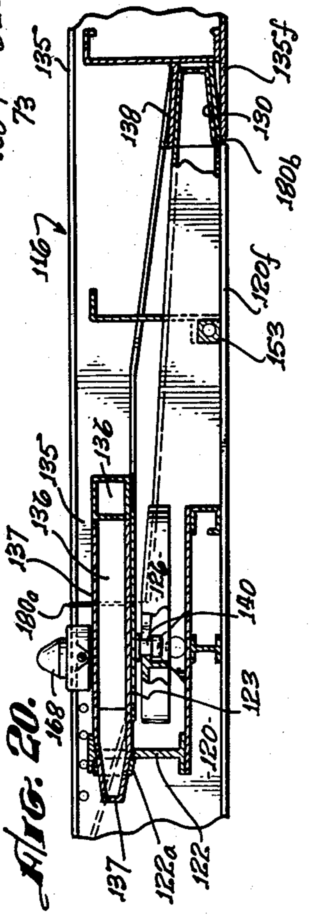

FIG. 20 is a fragmentary vertical section on line 20—20 of FIG. 19 through the overlapping portions of the two semi-trailer frames illustrating the manner of interlocking the two frames.

Figure 20A:
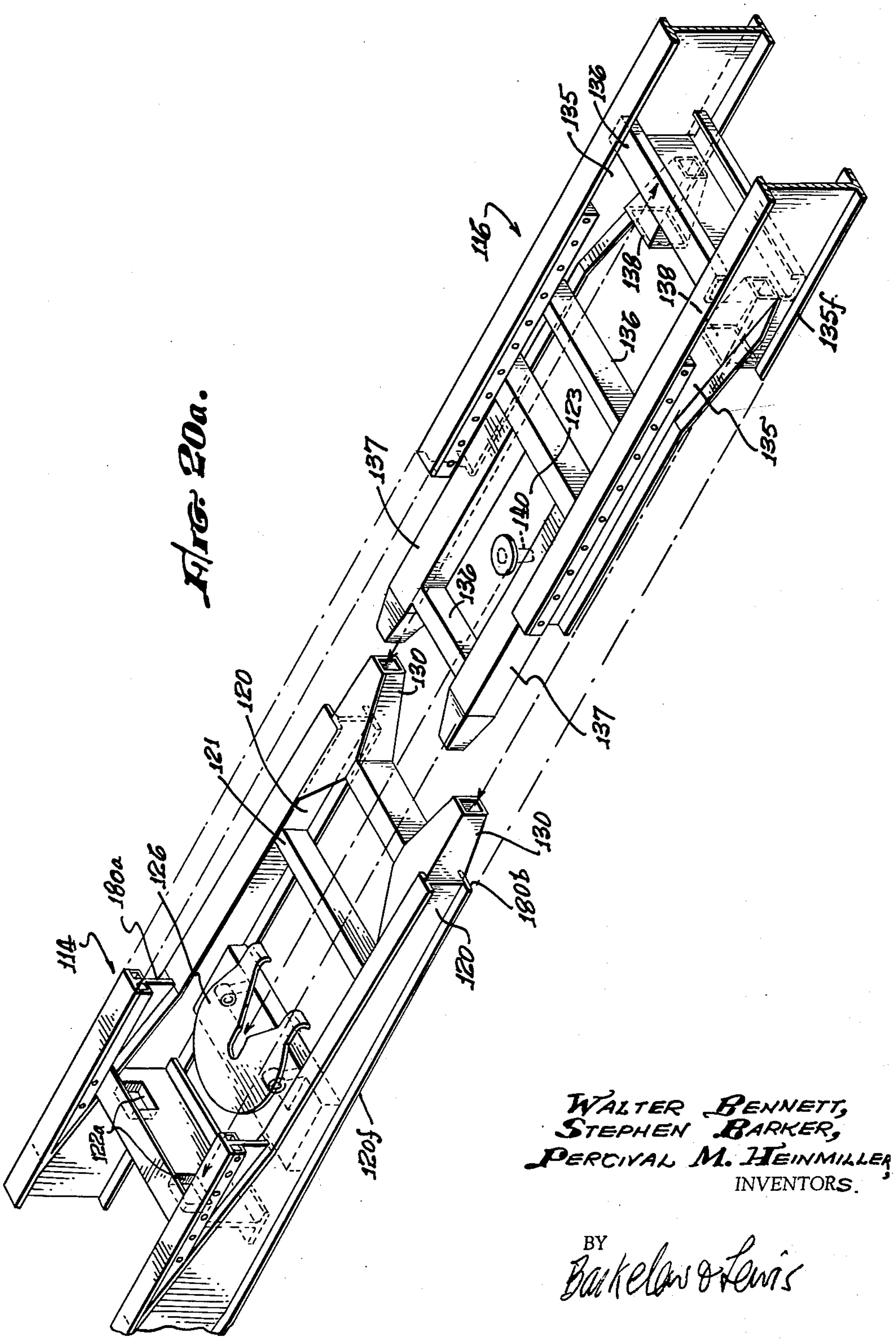

FIG. 20*a* is a fragmentary perspective of the overlapping portions of the two trailer frames in position to be engaged by relative longitudinal movement.

Figures 21, 22:
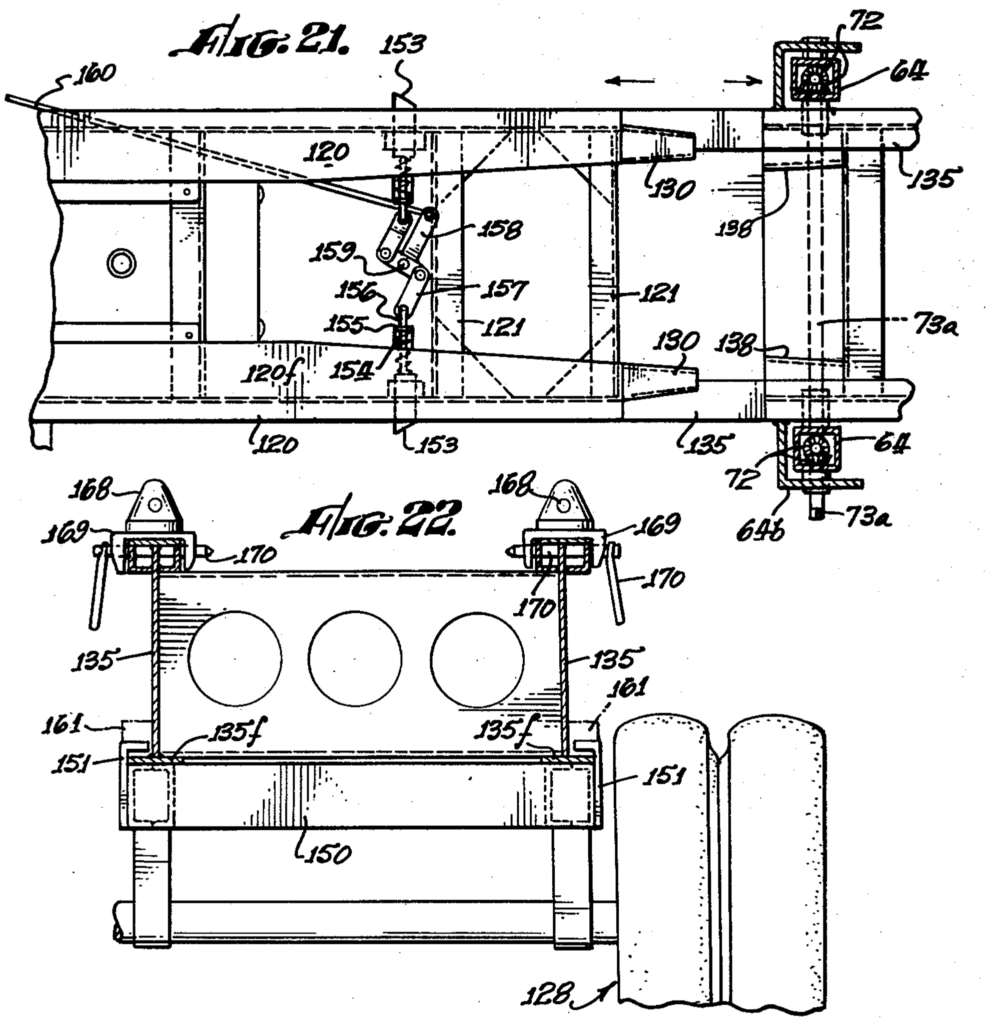

FIG. 21 is a bottom plan view on line 21—21 of FIG. 18 of the overlapping portions of the two trailer frames slightly separated.

FIG. 22 is an enlarged vertical transverse section on line 22—22 of FIG. 18.

Figure 23:
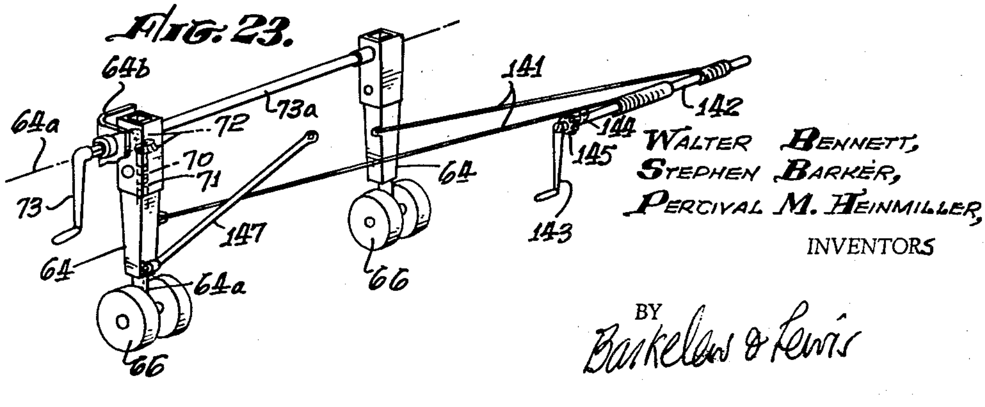

FIG. 23 is a schematic perspective illustrating the mechanism for raising and lowering supporting legs on the semi-trailer frames.

Figure 24:
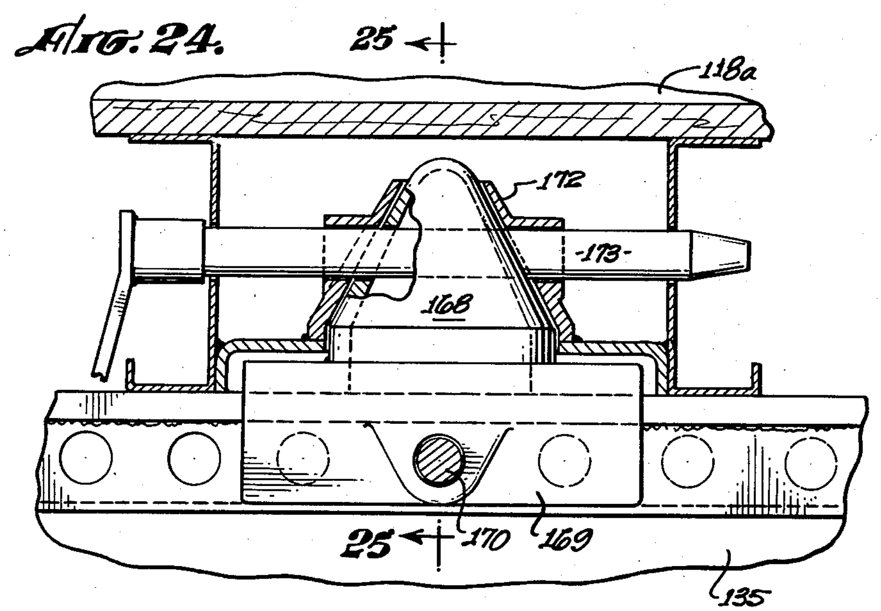

FIG. 24 is a further enlarged fragmentary vertical section in the plane of FIG. 22 illustrating the manner of locking the cargo container to the semi-trailer frame.

Figure 25:
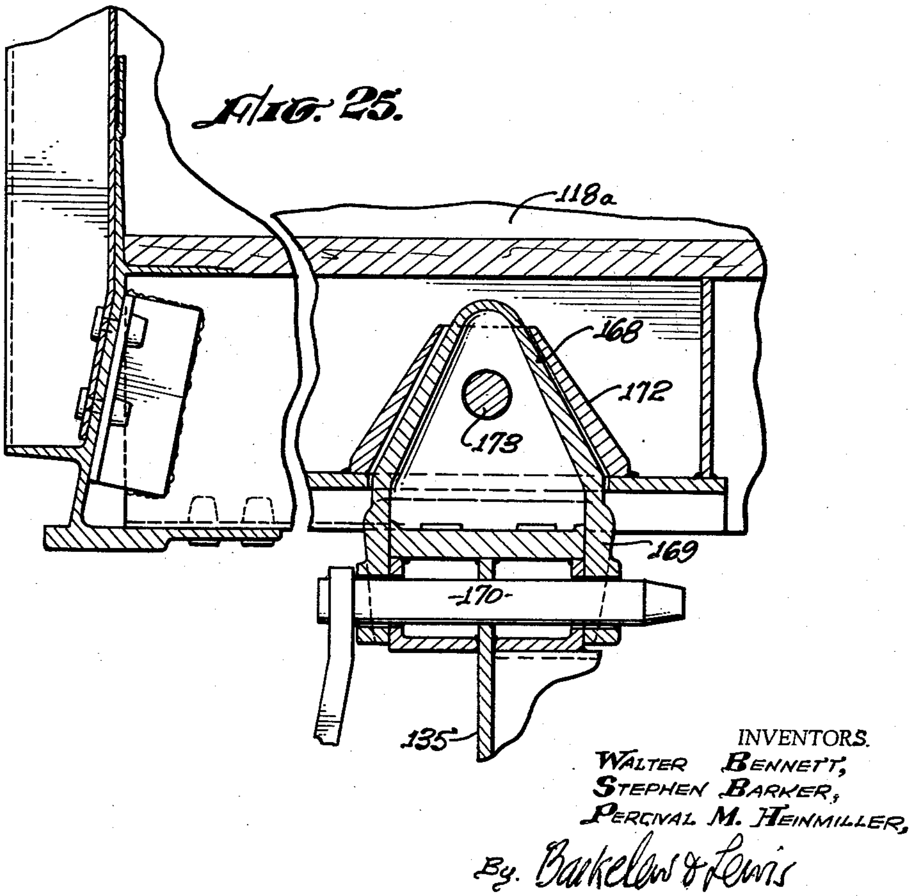

FIG. 25 is a fragmentary vertical section on line 25—25 of FIG. 24.

Figures 26, 30:
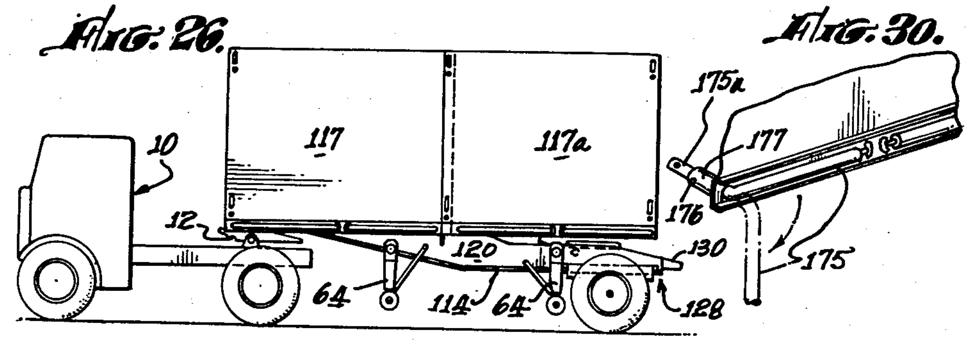
Figure 27:
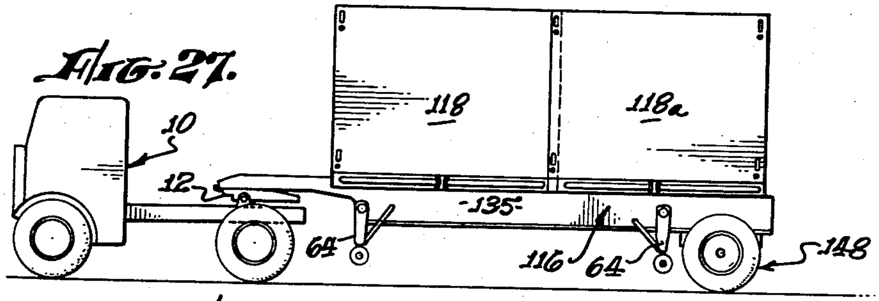

FIGS. 26 and 27 are schematic side elevations illustrating respectively the forward semi-trailer unit and the rearward semi-trailer unit of the second form of the invention attached to a tractor for towing thereby.

Figures 28, 29:
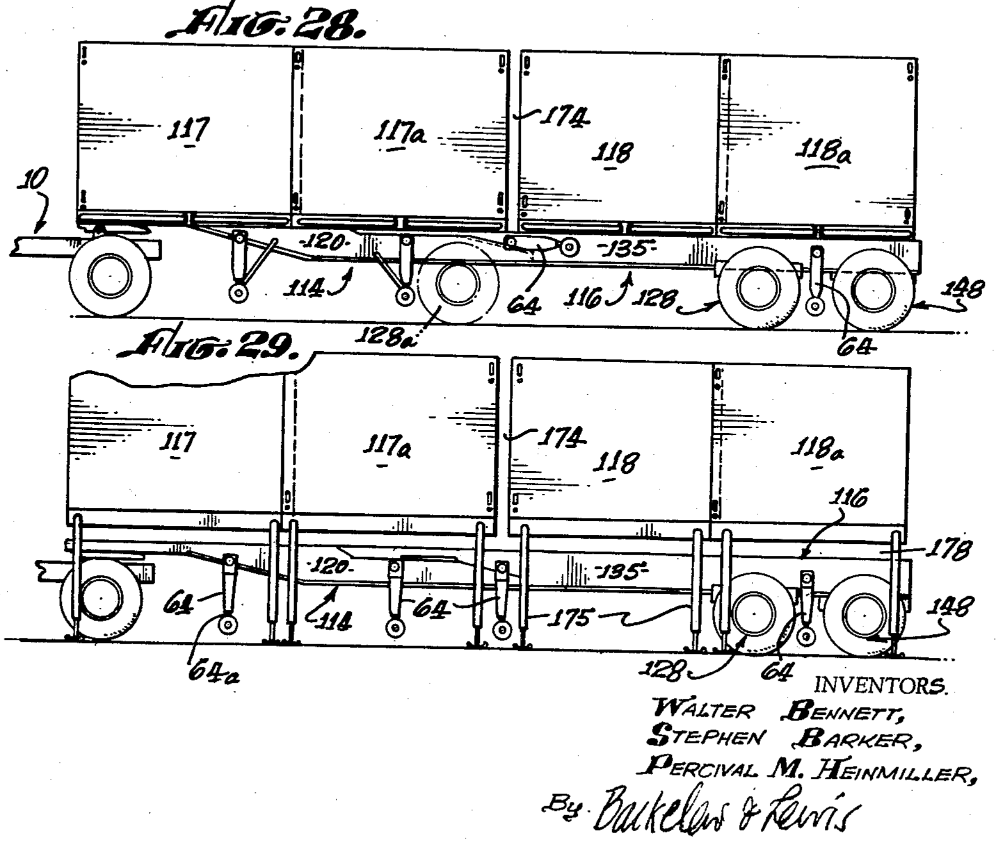

FIG. 28 is a schematic side elevation of the two semi-trailer frames interlocked to form a composite semi-trailer showing the displacement of the running gear from under the forward frame to a position under the rear frame.

FIG. 29 is a schematic elevation illustrating the manner of elevating the cargo containers to permit withdrawing the composite semi-trailer frame from underneath them.

FIG. 30 is a schematic perspective view illustrating the construction and movement of supporting legs on the cargo containers.

Referring now to the drawing, and particularly to FIGS. 1 and 2 wherein there is shown in side elevation a presently preferred embodiment of the present invention, it will be seen that the semi-trailer units are connected to a prime mover indicated generally at 10. This prime mover is a truck-tractor, more simply referred to hereinafter as a tractor, to which the semi-trailer units are connected to be towed. The tractor may be of any suitable design and construction and includes a fifth wheel element 12 mounted on the rear portion of the tractor chassis where it is accessible for connection to the forward fifth wheel element on a semi-trailer unit. Element 12 is a plate-like member mounted to tilt about a transverse horizontal axis by pivot 13. Except as later described, the fifth wheel unit 12 is of well known design and comprises essentially a plate with a rearwardly facing slot adapted to receive a pin element on the trailer being towed. This particular conventional construction is the same as is disclosed in connection with the semi-trailer units.

Connected to the fifth wheel 12 on the tractor is semi-trailer, or trailer-frame, 14, referred to herein as the forward semi-trailer unit. Behind semi-trailer 14 and connected to it, as will be described later in detail, is a second semi-trailer, or trailer-frame, 16, referred to as the rear semi-trailer unit. The semi-trailer units are different in construction as will become apparent, and the forward unit is more versatile in its uses. Both of the semi-trailers are alike in that each has a frame which is supported upon suitable running gear located at the rear portion of the frame, and, for certain connective assemblies, a slidably mounted fifth wheel element located on the forward portion of the frame which supports the trailer on a tractor or another trailer. Mounted on each of the two semi-trailers, or semi-trailer frames, is a cargo container 17 and 18 respectively.

In their preferred form, these cargo containers have features which will be described in detail later; but in the broad aspect of the present invention, these containers may be of any size, shape or construction adapted to be carried upon the two semi-trailers.

The construction of the frame of the forward trailer unit 14 will be apparent from FIGS. 9 and 10. The frame comprises a pair of spaced, parallel, longitudinally extending beams 20 of which but one is shown in each of FIGS. 9 and 10, the trailer being symmetrical about a longitudinal center line 23. These longitudinal members are connected together by suitable cross members 21 at intervals along the frame and also support a pair of transversely extending bolsters 22 upon which cargo container 17 is mounted. Toward the rear end of the trailer, longitudinal frame members 20 are offset downwardly as shown in FIG. 10 in order to support on the lower rear portion of the frame a rear fifth wheel element 24 at the standard distance above the ground surface. This fifth wheel element 24, like the corresponding forward element 12 on the tractor is a plate, mounted at 24*a* on the trailer to rock about a transverse horizontal axis, and having a rearwardly facing slot 24*b* adapted to receive the conventional king-pin of the cooperating fifth wheel element attached to the rear trailer being towed from the front trailer. At its rear end, the frame of trailer unit 14 is supported on a wheel and axle assembly indicated generally at 25 which may be of any suitable construction and supports the trailer on the ground.

At its forward end, the semi-trailer unit 14 is provided with a forward fifth wheel element, including king-pin 26. Pin 26 projects downwardly below the trailer frame from a fifth wheel plate and is adapted to be received in the rearwardly facing slot in fifth wheel element 12 mounted on the tractor, thus allowing the trailer to swing horizontally about a vertical axis established by the pin 26, relative to the tractor. A suitable latch mechanism in fifth wheel element 12 holds the pin 26 seated at the forward end of the slot in the plate 12. This latch shown schematically at 27 in FIG. 10 may be the same as the latch 28 associated with fifth wheel plate 24 at the rear of the trailer, the latch being urged forward into the locking position shown in FIG. 9 by spring 29 and retractable to permit disengagement of the pin from the slot by manual manipulation of handle 30 which projects laterally from beneath the plate 24.

The forward fifth wheel element 26 is slidably mounted upon the trailer frame for movement between the rear position shown in solid lines in FIG. 10 and the forward position 26*a* shown in broken lines. This is accomplished by mounting king-pin 26 in block 32 which is slidably mounted between a pair of guides 33 for movement longitudinally of the trailer frame.

Mounting block 32 is locked in the rearward position shown in FIG. 9 by latch bolt 34 which is normally urged into the advanced locking position shown by spring 35. A second latch bolt 36, similarly spring-biased to the advanced position shown, locks block 32 in the forward position shown in broken lines in FIG. 9. The two latches 34 and 36 are simultaneously retracted, to allow block 32 free movement between guides 33, by means of handle 38 when pulled downwardly in the figure. Handle 38 is pin connected at 39 to one arm of bell crank 40 which turns about fixed pivot 41, the other arm of the crank being connected to locking bolt 36.

In a similar manner handle 38 is pin connected at 39 to link 42 which in turn is connected to one arm of bell crank 43 which swings about fixed pivot 44 and is connected to the first latch bolt 34.

The reasons for shifting king-pin 26 longitudinally of the trailer unit will be more fully understood from further description.

At each side of the trailer frame is a vertical guide 37 depending from a side beam 20. These two guides 37 are so disposed with respect to the end of the frame of tractor 10 that the tractor frame fits between and engages the two guides, with normal working clearance, when king-pin 26 is in the rearward position, as shown in FIG. 1, but disengages the guides when the king-pin is in the forward position 26*a*.

Each of the two semi-trailers is provided with interfitting means engageable by relative longitudinal movement of the trailers to join the frames of the two trailer units together to form a single effective rigid frame. On the forward trailer unit the interfitting means consists of a variety of sockets. One of these sockets is a tapered socket formation formed between longitudinal members 20 by a pair of wedges 45, of which only one is shown in FIG. 9, the other being symmetrically located with respect to the longitudinal center line 23 of the trailer as may be seen in FIG. 11. These wedges 45 are each mounted on one of the longitudinal frame members 20 rearwardly of a transverse member 21 and provide a pair of forwardly converging faces 46. The forward portion of the frame of the rear trailer 16 is slidably received between the opposing faces 46, as will be later described.

The two wedges 45 are tapered both vertically and horizontally at their rear ends as seen in FIGS. 9 and 10 in order to guide the channel of the rear trailer unit more easily into the tapered socket formation on the front trailer. In order to take up any inaccuracies in manufacture and to provide a snug fit between the frames of the two trailers there may be provided a plurality of tapered shims 48 on one or more of the top, bottom and side faces of the wedge members 45, as may be seen in FIGS. 9 and 17. The rear socket means on the forward trailer are two in number and are indicated at 50. These sockets 50 are rectangular sleeves with rearwardly flared openings mounted on the rear cross member 21, as shown particularly in FIGS. 9, 10 and 11. The two sockets 50 are spaced apart laterally of the trailer and are located rearwardly from the tapered socket formation previously described to give the desired overlap for rigidity to the composite trailer formed by the two trailer units when joined.

In order to support the front end of trailer 14 when the trailer unit is not connected to and supported by the tractor, the trailer is provided at its forward end with a pair of out-rigger-type legs 52, one on each side of the frame. Each leg is an angular member, having a horizontally extending portion rotatively and slidably mounted in a sleeve 53 attached to the forward transverse leg is swung downwardly into contact with the ground as shown in FIG. 5. When the trailer is being towed, the leg is swung upwardly through an arc of 90° to the carrying position shown in FIG. 1. It is secured in this carrying position by passing it between the bifurcated end of bracket 54 (see FIG. 10) which projects outwardly from the side of the trailer frame, a locking pin 55 being slidable in the spaced end portions of the holding bracket to hold the leg in position. The leg slides in its associated sleeve in order that it may move horizontally into carrying positon between the ends of bracket 54. A second locking pin 56 (FIG. 9) is passed through registering holes in leg 52 and sleeve 53 in order to lock the leg in the down or load supporting position.

The frame of the rear semi-trailer unit is shown particularly in FIGS. 12 and 13. It comprises a pair of longitudinally extending frame members 60 which throughout much of their length are parallel to each other. The forward portions 60*a* of these longitudinal members converge forwardly at 60*a* to provide a tapered formation interengageable with the tapered socket formation on the front trailer. The taper of the members 60*a* conforms to the taper of wedge faces 46 of the wedges 45, as these portions of the two longitudinal members on the rear trailer are members on that unit which interfit with wedges 45 on the front trailer to join the two trailer units together. The trailer frame also includes a plurality of cross members 61 at intervals along the length of the trailer, together with suitable braces to give strength and rigidity to the trailer structure. The forward cross member 61*a* is in effect a part of the means interfitting with the members on the front trailer. On top of the longitudinal frame members 60 are two transversely extending bolsters 62 on which the container 18 is supported.

At the rear end, the trailer 16 is supported on a wheel and axle assembly 63, which may be of any suitable design and attached to the trailer frame in any suitable manner. For supprt at the forward end when not connected to a tractor or a forward trailer unit, the trailer is provided with a conventional pair of retractable and extensible legs 64 mounted one on each bracket 65. When lowered, the two legs 64 appear as in FIG. 13. In this position wheels 66 on legs 64 engage the ground to support the trailer and the load thereon.

Extension and retraction of the legs may be accomplished by any suitable construction, various arrangements being well known in the art. As illustrative of such means, each leg is made in two telescoping sections, the upper one of which may be provided with a fixed nut 70 and the other a screw 71 as indicated in phantom lines in FIG. 23. When the screw 71 is rotated by means of a pair of bevel gears 72 through the agency of crank 73, the lower leg section 64*b* is extended from or retracted into the upper leg section. Changing the length of legs 64 is advantageous for various purposes, including locating the forward fifth wheel element on the rear trailer unit at the proper height above the ground to be received by the rear fifth wheel element on the front trailer unit.

Disposed rearwardly of the frame members 60*a* are two tapered plugs 75, located one at each side of the frame on a bracket 65. These two plugs are the rear interfitting elements carried by the rear trailer to engage complementary elements 50 on the forward trailer. They are rectangular in cross-section and of a size to fit snugly within the tapered sockets 50 on the forward trailer unit. For this reason the two plugs 75 are located below the frame members 60 of the rear trailer and at such a height above the ground that the plugs can be inserted in sockets 50 by relative longitudinal movement of the two trailer units when they are coupled together.

The forward end of the rear semi-trailer unit 16 is provided with a forward fifth wheel element in the form of king-pin 76 which is designed to be receivable within the rearwardly facing slot 24*b* of the fifth wheel element 24 mounted on the rear end of the front trailer, or in any other similar fifth wheel element. King-pin 76 projects downwardly below a fifth wheel plate and the members of the trailer frame and when engaged in the fifth wheel element of the tractor or front trailer allows the rearward trailer to swing horizontally about a vertical axis established by the king-pin, provided that such movement of the rear trailer is not otherwise restrained or prevented.

The forward fifth wheel element 76 is mounted upon the frame of trailer 16 for longitudinal movement relative to the trailer between the forward position, shown in FIGS. 12 and 13 in solid lines, and the rearward position, shown in broken lines. This longitudinal movement is made possible by mounting king-pin 76 on block 77 which is slidably mounted between guides 79 for movement longitudinally of the trailer frame. Block 77 is locked in the forward position of FIG. 12 by a latch 80 which is normally urged into the locking position by a spring (not shown). When moved rearwardly on the trailer frame to the rear position, block 77 is locked in the rear position by a second latch pin 82. The two latches 80 and 82 may be simultaneously retracted, in order to allow block 77 free movement parallel to guides 79 by means of a linkage connected to both of the latch pins. Such linkage includes an operating handle 84 connected to one arm of bell crank 85 which rocks about fixed pivot 86, the other arm of the bell crank being attached to the outer end of latch 80. Handle 84 is connected also by link 87 to a second bell crank 88 which rocks about a fixed pivot 89, the other arm of the bell crank being attached to the rearward latch 82. It will be seen that as handle 84 is manipulated manually by pulling it in the direction of the arrow in FIG. 12, that the linkage just described operates to retract both of the latch pins in opposition to springs biasing them towards the locking position.

With the construction so far described various operating combinations of the tractor and the two trailer units are possible. One such combination is to couple the front semi-trailer unit alone to the tractor as shown in FIGS. 1 and 4*a*. Here the king-pin 26 upon the forward end of the trailer is coupled to the fifth wheel element 12 on the tractor, enabling the tractor to tow the one trailer unit. With this arrangement, king-pin 26 normally is in the rearward position which moves the semi-trailer unit up to the close coupled position. This close coupled position is occupied by forward trailer unit 14 in FIG. 1 in which the guides 37 engage the tractor body to prevent the trailer from swinging horizontally relative to the tractor. The effect is that of a single vehicle with a tandem axle assembly composed of the rear axle of the tractor and the running gear 25 of the trailer unit. Of course the two vehicles have an articulated connection at the fifth wheel which permits limited vertical movement of the trailer relative to the tractor about pivot 13.

Under some conditions greater maneuverability may be desired and this can be achieved by towing the front trailer unit as a semi-trailer free to swing horizontally about king-pin 26. This is accomplished by moving the king-pin forward to 26*a*, which shifts the trailer rearwardly relative to the tractor. This position of the trailer unit is shown in FIGS. 2 and 4 wherein the tractor frame no longer engages vertical guides 37.

It is also possible to tow the rear semi-trailer unit 16 alone, as shown in FIG. 3. This is done by coupling the rear trailer to the tractor by inserting king pin 76 in the slot 24*b* of the fifth wheel element 12 on the tractor. Normally the king-pin occupies the forward position shown in FIG. 12 when coupled directly to the tractor; but the king-pin may be moved to the rearward position 76*a* if space considerations permit. Whenever the rear trailer unit 16 is being towed, the wheels on extensible legs 64 are raised out of ground engagement by turning handle 73, as previously described. This enables the full weight of the trailer and its load to be carried upon the running gear 63 and the tractor 10.

A fourth arrangement is one including both trailers as shown in FIG. 1. In this combination of units, the forward trailer is connected directly to the tractor, as in FIG. 4, and the rear trailer unit 16 is then coupled to the forward trailer by connecting the fifth wheel elements on the two trailer units. In this combination, king-pin 76 is in the forward position shown in full lines in FIG. 13 allowing the rear semi-trailer unit the normal range of horizontal and vertical movements of a semi-trailer. In this combination the rear trailer is being towed by the forward trailer; and the two trailer units are operating independently and each has its own running gear in contact with the ground surface.

A fifth combination of units is that shown in FIG. 2. This combination is derived from the combination of units illustrated in FIG. 1 by moving the forward trailer unit longitudinally back with respect to the front trailer unit to close the gap between them. It is most practical to block the rear trailer wheels and move the front trailer with the tractor. This longitudinal movement is made possible by the range of movement to which king-pin 76 is adapted, the king-pin being moved to the rearward position 76*a* to accomplish this combination of the elements. As the rear semi-trailer unit is moved forwardly, the interengaging formations on the two units are brought into inter-fitting relationship with the result that the two trailer units become a single composite trailer with a rigid frame.

In the position of FIG. 2, the forward tapered portion of the rear trailer formed by portions 60*a* of the frame members is guided between the two wedge sections 45 on the forward trailer to overlap these wedge sections. The forward section 60*a* of the rear trailer beam is preferably in the shape of an I-beam or a channel having flanges which engage both the upper and the lower surface of each of the wedges 46. See FIG. 11. Inequalities in manufacture can be compensated for by one or more shims 48 which assure a snug interfitting between the elements of the two trailer units.

The same relative longitudinal movement of the two trailer units causes plugs 75 to enter and engage the walls the sockets 50 at the rear of the forward trailer unit. The engagement of these units is shown in detail in FIGS. 16 and 16*a*. The plugs 75 are a size and shape that fits snugly within the sockets and have their forward ends tapered as illustrated to facilitate entry into the sockets. Plugs 75 and sockets 50 include both vertical and horizontal tapers to bring the two frames into proper fit in spite of any initial misalignment of the parts.

It will thus be apparent that on the two trailers there are two sets of complementary, mutually engaging elements which interfit both laterally and vertically at longitudinally spaced positions of the two trailer units. The forward set of inter-engaging elements includes the members 60*a* and the wedges 46 on the rear and front trailers respectively. The rearward set of inter-engaging elements includes plugs 75 and sockets 50. When once moved into this interengaging position portions of the trailers overlap as illustrated in FIGS. 16 and 16*a*. Relative movement of the two trailers is prevented by locking the king-pin on the rear trailer in the rear position and locking it in the fifth wheel 24 of the forward unit. Because of the interfitting of elements on the two trailers, their interengaging fifth wheel elements no longer perform all the functions of the usual fifth wheel arrangement but they do serve to lock the two trailers in position with respect to each other to form a single rigid composite trailer and to transmit the tractive force from the forward portion of this rigid trailer to the rearward portion.

When the two trailer units are a single composite trailer, it may be desired in special situations that the running gear of the forward trailer unit be moved out of contact with the ground surface in order to gain greater maneuverability of long trailer. This is gained by having only one pair of wheels down on the road. While various other arrangements are possible for this purpose, in the form of the invention illustrated in FIG. 2, the front end of the composite trailer is elevated sufficiently to lift the wheels of the forward running gear 25 out of contact with the road surface as shown in FIG. 2. This is accomplished by mounting the tractor fifth wheel element 12 on base plate 90, the base plate being attached to the chassis of the tractor by two pairs of parallel links 91 which permit the base plate to be raised and lowered relative to the tractor chassis while still maintaining the base plate in a horizontal position. The base plate is raised and lowered by piston and hydraulic cylinder 93, the end of the piston rod being attached to the under side of base plate 90. By filling the cylinder with hydraulic fluid under pressure, from some suitable source not illustrated, the piston is urged to the end of the cylinder, forcing base plate 90 upwardly and raising the forward end of the composite trailer. This in turn lifts wheels 25 off the ground, as shown in FIG. 2 and only the running gear on the rear trailer is in engagement with the ground and supporting the trailer.

For ordinary over-the-road use, the composite trailer is operated with the wheels of both axles on the ground to carry the load. A fifth wheel plate of usual design may be used in the tractor, such a wheel having the pivot 13 mounted on the chassis of the tractor. This usual design is non-elevating and is shown in the schematic FIGS. 3 and 4. The elevating type of fifth wheel just described is intended to meet special stiuations and is not necessarily limitative upon the invention.

The trailer units so far described may carry any kind of cargo or cargo containers. For example they may be supplied with fixed bodies. However, in the preferred embodiment the present invention contemplates removable containers having certain structural features as will now be described in order to obtain further advantages of the invention.

Each of the two trailer units 14 and 16 carries a cargo container 17 and 18 respectively. Each container is supported upon the trailer by two transversely extending bolsters, indicated at 22 on the forward trailer and 62 on the rear trailer. For purposes of interchangeability, the bolsters are of the same size and shape on both trailers and are spaced apart longitudinally of the trailer the same distance. Likewise, the cargo containers 17 and 18 are duplicates of each other so that the description of the container on the forward trailer unit will suffice for both.

Referring to FIGS. 1 and 10 especially, it will be seen that the bottom of the container 17 is provided with inverted transverse channels 94 at two spaced positions beneath the floor of the container in order to receive the bolsters 22. As shown in FIG. 15, each channel 94 is closed at the lateral ends by a longitudinal beam member 95 which engages the ends of the bolsters. Container 18 has similar closed-ended channels, indicated at 94, engaging over the bolsters 62 of the rear unit. Thus the closed-ended channels at the bottom of the containers hold the containers against shifting either longitudinally or laterally on the trailers. In addition, it is desirable to provide some type of tie-down means. While such means are well known in the art and any suitable type may be employed, as typical of such means there is here shown a cable 96 having a hook 97 on the free end which is engageable with an opening 97*a* in the container, as shown particularly in FIG. 15. The cable is wrapped around a drum 98 by means of which the cable may be tightened. A holding pawl engaging a ratchet wheel 99 on the drum prevents reverse rotation of the drum after the cable has been tightened.

The bolsters 22 and 62 are located at predetermined positions on the trailer frames and thereby each container is located at a predetermined position upon the respective trailer and with respect to the elements of the trailer. Advantage may be taken of this feature to effect an interfitting engagement of the containers on the two trailer units by moving the trailer units into position with their frames interfitting as in FIG. 2.

Each of the containers is rectangular in plan and is provided at each of the four corners with a vertical columnar formation by which such engagement of the containers is effected. Referring now particularly to FIGS. 7, 8 and 8*a*, it will be seen that the container 17 has at one corner a vertically extending column formation indicated at 100 which projects outwardly beyond the vertical face of end wall 17*a* of the container. The column formation 100 is so located with respect to the corner that one face of the column is substantially coplanar with the side wall 17*b* of the container. As indicated schematically in FIG. 8*a*, the same columnar formation is provided at the diagonally opposite corner of the container where the column projects endwise beyond the other end wall 17*c*.

At the two remaining corners of the container, which are diagonally opposite each other, the container is provided with a vertical columnar formation of the type indicated at 102. It will be noted that this formation is removed inwardly from the side face 17*b* of the container but porjects outwardly from the end wall 17*c* of the container. A similar formation is located at the diagonally opposite conrer (see FIG. 8*a*) where the formation 102 projects beyond end wall 17*a*.

At the ends of the container and spaced from but parallel to column formations 102 there is located near the top corner of the container plate 103 and near the bottom corner of the container plate 104. Each of the plates 103 and 104 is provided with a hole aligned with a similar hole in the column 102, so that a pin 105 can pass through the openings in both plate 103 and the column formation and a similar pin 106 can pass through aligned openings in plate 104 and column 102. From FIG. 8 it will be noticed that each column formation 100 is provided with upper and lower openings 107 which are at the same distance above the bottom of the container as the pin-receiving openings in column 102 and therefore can be moved into registration with the openings in columns 102 and plates 103 or 104 in an adjoining container to receive pins 105 or 106 as shown in FIG. 6.

Each pin 105 and 106 is provided with a handle 108 to assist in inserting and removing the pin and which is received behind keeper plate 109 to hold the pin against accidental displacement.

The registered positions of the two containers 17 and 18 on the two trailer units are such that when the trailer units are brought into the rigid interfitting position of FIG. 2, the interfitting corner column elements on the two containers are brought into registration to interfit with each other as in FIG. 8*a*. As shown particularly in FIG. 6, the projecting column 100 of container 18 is now in position adjacent column 102 of container 17 and between the column and the plates 103 and 104. Likewise, as indicated in FIG. 8*a*, column 100 of container 17 is in the same interfitting relation to column 102 as container 18. The lower pin receiving holes in these pairs of three members are in horizontal registration so that pin 106 may pass through all of the lower holes to lock the two containers securely together. The same is true of the upper sets of holes receiving pin 105. The containers are thus locked together in end-to-end relation by four pins, two pins 105 at the upper corners and two pins 106 at the lower corners. The coupled containers may now be handled as a single unit when they are removed from the trailer.

Each column formation 100 and 102 is provided near the top with an opening 111 of a size to receive the hook or projectible bolt of a hoisting bridle. The containers can be handled individually if desired, or in coupled pairs by inserting the hooks (not shown) in the openings 111 at the four corners of a single container or a coupled pair as the case may be. In the latter case, the two lower pins 106 are especially relied on to hold the containers against relative displacement in any direction. Similar openings 111 are provided near their bottoms through the columns, to receive hold-down members. The general relations of the columns and their openings to their respective container bodies is a subject matter of application Serial No. 840,606, filed September 17, 1959, by Percival M. Heinmiller and Stephen Barker.

There is shown in FIGS. 18 through 30 a variational form of our invention in which certain of the parts are different in form or construction but still similar in function to the embodiment of the invention just described. The alternative embodiment will now be disclosed briefly with special reference being made to the differences in construction and operation between the two embodiments.

This second embodiment of the invention comprises a forward semi-trailer unit 114 which can be connected to the fifth wheel 12 of the tractor 10 for towing thereby. Behind semi-trailer unit 114 and connected to it in a manner which will be described, is a second semi-trailer unit 116 which is the rear semi-trailer unit of the pair. These two trailer units are each longer than in the embodiment previously described so that each trailer unit is capable of carrying two of the same sized cargo containers. Thus in FIGS. 26–28 it will be seen that two cargo containers 117 and 117*a* are loaded on the forward trailer unit while two cargo containers 118 and 118*a* are loaded onto the rear trailer unit. It will be understood that ths arrangement is a matter of relative sizes and is not limitative upon the invention since each trailer unit may be designed to carry one or more cargo containers. Each of the cargo containers is constructed as previously described and the two carried on a single semi-trailer unit, as 117 and 117*a*, are preferably inter-locked end-to-end in the manner already disclosed.

The construction of the frame of the forward trailer 114 is shown particularly in FIGS. 18 and 19 where it will be seen that the frame comprises a pair of parallel, longitudinally extending beams 120 which are interconnected by a plurality of tranverse cross members designated at 121. In addition a cross beam 122 extending between the longitudinal beams 120 is made particularly strong and is provided with two openings lined with sleeves 122*a* as may be seen in FIG. 20, to receive portions of the rear trailer frame. The forward trailer 114 is provided near its front end with a fixed forward fifth wheel element, king-pin 124 beneath plate 123, which is adapted to be engaged in the fifth wheel plate element 12 on the tractor. Toward its rear end, the same semi-trailer unit is provided with a rear fifth wheel element 126 which is a plate-type element mounted on the trailer frame to rock about a transverse horizontal axis in the same manner as is usual for this element in the tractor. This rear fifth wheel element is adapted to receive the cooperating forward fifth wheel element—a king-pin—on the rear trailer unit. The fifth wheel plate 126 is provided with a latch mechanism 127 of the type already described which locks in place the cooperating element of the rear trailer and thereby locks the two trailers together when they are in position to form a single rigid trailer frame.

When the forward trailer 114 is operating alone it is supported at the rear end by a wheel and axle assembly 128 of any suitable design which provides running gear for the trailer at the rear end. One of the features of the present invention is that this running gear is shiftable with respect to the trailer; but the means by which this shifting is accomplished will be more easily understood after the description has progressed further.

In order to support the forward end of trailer 114 on the ground when uncoupled from the tractor, or to support the trailer and load independently of the running gear 128, the trailer is provided with at least one pair and preferably two pairs of extensible legs 64. These legs have already been described as having ground engaging wheels 66. These legs each include a lower telescoping section 64*a* that can be extended manually by means of the gear and screw arrangement illustrated at 70, 71 and 72 in FIG. 23, or by any other suitable mechanism. Legs 64 are preferably mounted one pair forwardly on the trailer and a second pair rearwardly in order that the entire trailer may be supported in a stable position upon the four legs 64.

As in the first embodiment described, so in the second embodiment each of the two semi-trailers is provided with interfitting means engageable by relative longitudinal movement of the two trailers to join the frames of the two trailer units together to form a single effective rigid frame. On the forward trailer unit this means includes as the forward element a pair of laterally spaced sockets 122*a* on the transverse beam 122, as shown particularly in FIGS. 20 and 20*a*. The rearward interengaging elements on the forward trailer frame are the two tapered extensions 130 located one at the rear end of each longitudinal side beam 120. These extensions 130 are tapered both horizontally and vertically as may be seen particularly by reference to FIGS. 21 and 26.

The frame of the rear semi-trailer unit 116 is shown in FIGS. 18, 19 and 20*a*; and comprises a pair of spaced, longitudinally extending side beams 135 which are interconnected by a plurality of transversely extending cross members 136 at intervals throughout the length of the trailer frame. Disposed just inside of and projecting beyond the ends of side beams 135 is a pair of forwardly extending members 137 which are adapted to be received in and to interfit with the sockets 122*a* in the cross beam 122 of the forward trailer unit. The tips of these extensions 137 are preferably tapered both horizontally and vertically as may be seen particularly in FIGS. 19 and 20 in order that they may be more easily guided into sockets 122*a* and correct any initial misalignment of the two trailers. Rearwardly of the forward end of the rear trailer unit and spaced longitudinally from the members 137, the rear trailer 116 is provided with a pair of tapered sockets 138 just inside of the side frame members 135, each of which sockets is adapted to receive the end of one of the tapered extensions 130 which projects beyond the side beams of the forward trailer.

When portions of the trailer frames are overlapped to bring these interfitting elements into engagement as shown in FIGS. 19 and 20, the two trailer units 114 and 116 become a single rigid trailer frame which is inherently adapted to support upon itself any suitable load. FIG. 20*a* shows in perspective the overlapping portions of the two trailer unit frames ready to interengage as a result of longitudinal movement. The paths of the interfitting elements on the two frames are indicated by broken lines with arrows. Moved into engagement, the frames appear as in FIGS. 18 and 19.

At its forward end, the rear trailer unit 116 is provided with fixed king-pin 140 carried beneath plate 146 which is engageable with the fifth wheel plate 126 of the forward trailer unit or with the plate 12 of the tractor, depending upon whether the rear trailer unit is operating in conjunction with the forward unit or operating separately, as in FIG. 27 which shows the rear trailer alone being towed by the tractor. Inter-engagement of these fifth wheel elements locks the two trailer units together.

Rear trailer unit 116 is likewise provided with two pairs of extensible legs 64. One pair is located forwardly on the trailer frame and the other pair rearwardly on the trailer frame, as seen particularly in FIGS. 18 and 27. One departure from the leg structure already described is that the forward pair of legs 64 is not fixed but is swingingly mounted outside of or laterally beyond the side beams 135 of the rear trailer. This location of the legs is advantageous since the legs may be rotated through an arc of approximately 90° between an upright position in which they support the load and a horizontally extending position, as shown particularly in FIG. 28, in which the entire leg structure is raised above the lower flange of the side beams in order to permit shifting of the movable running gear 128, as will be described.

This movement of the legs is accomplished by the structure shown schematically in FIG. 23 in which the pair of legs 64 is mounted to swing about the horizontal axis established by shaft 73*a*. The legs at their upper ends have heavy bosses 64*b* at opposite sides which provide bearings for the swinging movement of the legs and shaft 73*a* is journaled in these bosses, in the case of the forward pair of legs on the rear trailer. The legs are raised by cables 141 which are attached at their free ends to legs 64 and are wrapped around the drum 142 which may be rotated by means of attached crank 143. By winding the cables on the drum, the legs are lifted to the horizontal position and held in that position by engaging pawl 144 with ratchet 145 which is rigidly connected to drum 142. When the pawl is disengaged from the ratchet the weight of the legs is sufficient that they drop by gravity to the load supporting position. In order to permit this swinging movement of the leg 64, the knee braces 147 are either provided with detachable fastenings at the upper ends so that they may be disconnected from the frame of the trailer or else are made in two pivotally interconnected sections, as is well known in the trailer art.

At the rear end, the trailer unit 116 is provided with the usual running gear in the form of a wheel and axle assembly 148 which may be of any suitable design. This running gear may be attached to the trailer frame at a fixed location, as is usual.

However, it is one of the features of the present invention that the running gear 128 may be shifted between the position of FIG. 26 in which it is under the forward trailer 114 to the position of FIG. 28 in which the running gear 128 is under the rear end of the rear trailer unit. In order to accomplish this longitudinal shifting movement of the running gear 128, the axle is attached to a frame 150 shown particularly in FIG. 22 which slidably and supportingly engages the undersurfaces of side rails on the two trailer units.

Each of the side beams 120 and 135 of the two trailer units has the shape and cross section of an I-beam, as may be seen by reference to FIGS. 20*a* and 22 wherein the longitudinal beams 135 of the rear unit are shown. The bottom flanges of the side beams rest upon the top of the wheel frame 150. The wheel frame 150 is also supplied with side plates 151 which slide along the outer edges and upper faces of the flanges of the trailer frame. These side plates 151 have substantial length longitudinally of the trailer frame to hold the wheel assembly against any twisting movement with respect to the trailer frame as well as to hold it against lateral displacement.

The bottom flange 120*f* of the side beam 120 at each side of the forward trailer unit is aligned as closely as possible, both vertically and horizontally, with the bottom flange 135*f* of the corresponding side beam 135 of the rear trailer. This alignment is clearly shown in FIGS. 19 and 20. The two bottom flanges 120*f* and 135*f* abut each other at 180*b*. As a result, the bottom flanges of the two side beams when together are in effect a continuous longitudinal rail which allows the wheel and axle assembly 128 to be shifted along this rail to any desired position, although it may be assumed that ordinarily the wheel assembly will occupy one of two terminal positions.

When moved to the forward position 128*a* shown in dotted lines in FIG. 18, the wheel assembly 128 abuts fixed forward stop 152 which limits forward travel of the wheel assembly. The rear side of the wheel frame is engaged by movable latch bolts 153, there being a pair of such bolts, one at each side of the trailer frame. This latching mechanism is shown viewed from the underside in FIG. 21 wherein the two latch bolts 153 are shown biased toward the outer or locking position by springs 154 which bear against stationary guide 155. The latch bolts are connected by rods 156 and links 157 to opposite ends of the head of the T-shaped bell crank 158 which rocks about fixed pivot 159. When bell crank 158 is rocked counter-clockwise viewed in FIG. 21 by pulling on operating rod 160, the biasing springs 154 are compressed and the two bolts 153 are simultaneously retracted, allowing wheel frame 150 of the running gear to move longitudinally rearward with respect to the trailer frame.

When moved rearwardly into the full line position shown in FIG. 18, the frame of the running gear assembly 128 engages fixed rear stops 161, one on each side, which prevent further rearward travel of the wheel assembly relative to the trailer frame. The running gear frame is also engaged by a pair of latch bolts 163 located one at each side of the frame on the side beams 135. With this latching mechanism, each latch bolt 163 is normally drawn down into locking position by spring 164 which is attached at one end to the trailer frame and at the other end to operating handle 165, the handle being connected to the latch bolt by pivoted link 166. The operating handle is pivotally attached at one end to the trailer frame and by moving the handle upwardly in a clockwise direction in FIG. 18, the handle withdraws latch bolt 163 against spring 164. The running gear is now free to move forwardly.

In order to move the wheel assembly between the two positions shown in FIG. 18, the wheels of assembly 128 are blocked fore or aft and then the trailer is moved relative to the running gear, the trailer frame sliding over the top of running gear frame 150. By driving the trailer forward with blocks in front of the wheels, the running gear is shifted from under the front trailer at position 128*a* to the rear position shown in full lines in FIGS. 18 and 28 where the running gear is under the rear of the rear trailer unit.

In this embodiment of the invention, registration of the cargo containers on the trailers is attained by a different means than previously described, although bolsters 22 and 62 can obviously be modified and mounted on the trailer units to accomplish the same results. This variational registration means is shown in FIG. 22 and in greater detail in FIGS. 24 and 25. The registration means comprises a plurality of conical members 168 each provided with an inverted U-shape base 169 which is preferably integral with the conical member. The depending flanges of the base 169 are provided with aligned holes designed to receive a locking pin 170. The side beams 135 and 120 of each trailer, are provided with a plurality of spaced openings in a row just beneath the top flange of the side beams. When the holes in the base 169 are in registration with one of these openings in the side beams, the pin 170 can be passed through them as in FIG. 25 to lock the conical registration member to the trailer frame in a predetermined position. These predetermined positions of the conical registration members on the frame of the trailer are such that when the cargo carriers are loaded onto the trailers, the registration cones will be received in mating conical recesses in the undersides of the cargo containers provided by the inverted cup like members 172. By passing a locking pin 173 through aligned openings in a registration cone 168 and a receiving cup 172 as shown in FIG. 24, the cargo container is locked to the registration cone and through it and pin 170 to the trailer frame. This structure serves as a tie-down as well as to hold the containers against longitudinal displacement.

Ordinarily there will be four such registration members on a trailer frame to secure proper registration and attachment of the cargo container to the trailer frame; but it will be realized that a larger or smaller number of these registration members may be used as desired. If a pair of containers as 117 and 117*a* are not interlocked each container may require four registration members.

The top flange of the side beam 120 of the forward trailer is designed to abut at 180*a*, and become an effective continuation of, the top flange of the corresponding side beam 135 of the rear trailer member in the same way as bottom flanges 120*f* and 135*f*, as may be seen particularly from FIG. 19. To achieve this continuity the top flanges of the trailer side beams are aligned both horizontally and vertically. Thus the top flanges provide in effect a continuous track along which the registration members 168, 169 may slide for the full length of the composite trailer unit, moving from one trailer unit to the other trailer unit.

The two semi-trailer units constituting the second embodiment of the invention may be used in various ways. Each of the trailers may be used by itself, towed by a tractor. FIG. 26 illustrates the forward trailer unit 114 coupled to the tractor 10 for towing thereby. In this arrangement the king-pin 124 on the forward end of the front trailer is attached in the usual manner to the fifth wheel plate 12 on the tractor, as may be seen in FIG. 18. To permit use of the trailer in this manner, the movable running gear 128 is advanced to the forward position which is the load supporting position at the rear of trailer frame 114.

In a similar manner, the rear trailer unit 116 alone may be towed by tractor 10 as shown in FIG. 27. When this is done, the king-pin 140 at the forward end of the rear trailer is engaged with the plate element of the fifth wheel 12 on the tractor to couple the tractor and trailer together in the usual manner. The rear end of the trailer is provided with the usual running gear 148 which, together with the tractor, supports the load on the trailer.

Since the two trailers are provided with two sets of complementary, mutually engaging elements which are adapted to interfit at longitudinally spaced positions on the two trailer units, the frames of the two trailers may be coupled together as shown in FIG. 28 to provide a single composite rigid trailer frame. This composite trailer is towed by the tractor. When the two trailer frames are coupled together by relative longitudinal movement to bring the interfitting members on the two trailers into engagement, the running gear 128 is initially underneath the forward trailer. In order to slide the running gear rearwardly, the forward pair of legs 64 of the rear trailer unit 116 is swung upwardly to the position shown in FIG. 28, thus removing them from the path of running gear 28. This running gear can now be moved relative to the trailer frame by blocking the wheels on the front side and pulling the rigid trailer frame forwardly. The effect is to shift the slidable running gear 128 to the rear position in which it is locked by latch bolt 163, as shown in FIG. 18.

The cargo containers on the two trailer units occupy predetermined positions on each trailer unit by virtue of engagement of the cargo cocntainer with the conical registration members 168, or any other suitable registration means, which are located at predetermined positions on their respective trailer frames. Advantage may be taken of this relationship to locate the registration cones so that when the cargo containers are lowered onto the trailer units the containers assume positions such that, when the trailer frames are interlocked to form a single composite trailer, the corner columns of the containers are brought together in position to be interlocked by pins in the same manner as previously described. Alternatively the containers on the two semi-trailer units may be so located thereon that there is left a gap between them, as at 174 in FIGS. 28 and 29, after the composite trailer is formed. Since the containers 117 and 117*a* are already interlocked they function as a single container under the circumstances. The same is true of containers 118 and 118*a*. The containers that are coupled end-to-end may be lifted as a unit from the composite trailer by inserting suitable hooks of a hoisting bridle or sling in the corner openings 111. Alternatively, the pins may be withdrawn from the interlocking columns and the cargo containers can be then removed individually from the composite trailer.

In connection with this second embodiment of the invention, there is shown a modification of the containers which is an optional feature of the invention and which also may be incorporated in the containers carried on the trailer frames first described. This feature relates to swingable legs attached to the containers by which the containers may be self-supporting at an elevation such that the trailer can be moved under the standing containers or pulled out from under them to leave them standing independently.

Legs for this purpose are illustrated in FIGS. 18 and 30. Each container has plurality of angular legs 175, there ordinarily being four such legs mounted on each of the containers. As seen best in FIG. 30 each leg 175 comprises a horizontally extending portion 175*a* which is rotatably and slidably received in sleeve 176 securely attached to the frame work of the container at a position below the container floor. When travelling, the legs are rotated in sleeves 176 so that the outer portion of the leg is close to the container frame where it may be secured by any suitable means. This travelling position is shown in FIG. 18 and in full lines in FIG. 30.

In order to support the container from the ground, each leg is pulled out horizontally, sliding in sleeve 176, and then rotated downwardly through an arc of approximately 90° so that the outer portion of the leg is vertical. A pin 177 passing through the horizontal portion of each leg and the surrounding sleeve 176 holds the leg in vertical load supporting position. The legs in this position are able fully to support the containers; and the vertical portion of the legs are located laterally beyond the running gear of the trailer units, as shown in FIG. 29.

To use the legs in this way, the trailer frame and the load thereon are raised a short distance using the legs 64 on the trailer as jacks. Extending legs 64 elevate both the trailer frame and the containers. Next the container legs 175 are swung down to a vertical position as in FIG. 29. To accommodate the legs 175 to inequalities in ground level or trailer height and for other obvious reasons, each leg is preferably adjustable in length. While any suitable construction may be employed for this purpose, the legs 175 are then shown as having an internal, telescoping section carrying in its outer end a ground-engaging pad. The legs 64 on the trailer are then retracted to lower the trailer and the containers, bringing the lower ends of container legs 175 into contact with the ground. Continued retraction of legs 64 brings the weight of the containers entirely into legs 175 and lowers the composite trailer frame out of load supporting engagement with the containers. There may be definite clearance between the trailer and the containers as indicated at 178 in FIG. 29. Since legs 175 have been moved laterally to a point where they clear the running gear, the trailer can be pulled out from unlerneath the containers which are then left in free-standing position on their own supporting legs 175. Obviously, by reversing the sequence of operations the containers can be loaded onto a composite trailer frame.

In order to free the containers from engagement with the composite trailer, all the pins 170 are pulled out, releasing the conical engaging members 168 from the trailer frames. The top flange of the side beams of the two trailer frames being in effect continuous tracks upon which these conical registration members can slide, the trailer can be pulled out from underneath them, leaving the conical members attached to the containers. If desired, these registration members can then be released from the containers by removing pins 173.

As a variation, all pins 173 are pulled and the cones 168 can then be lowered with the composite frame to clear the container, this operation requiring greater clearance between the containers and the trailer frame than the first described procedure. Obviously, the appropriate pins are inserted as required when containers are loaded on the composite trailer.

It will be obvious that the same procedures as just described may be applied to containers on either of the two trailer units alone when one or more of the containers are placed on their own legs and the trailers moved out from under them. When one trailer unit is run under one or more containers to be loaded thereon, the steps described may be reversed, the appropriate pins being inserted as required instead of being removed.

In the event the containers are lifted off the trailer units by hoisting tackle, as earlier mentioned, it is contemplated that the cones will usually be detached from the containers by pulling pins 173 and retained with the trailer. In general, the containers are disconnected from the trailer units by removing one set of pins prior to removal of the containers from the trailer units, whether the latter are operating singly or as a composite trailer.

From the foregoing description it will be apparent that many changes in the details of design and arrangement of parts of the present invention will occur to persons skilled in the art without departing from the spirit and scope of the invention. Accordingly, it is to be understood that the foregoing description is considered to be illustrative of, rather than limitative upon, the invention as defined by the appended claims.

We claim:

1. The combination of a plurality of longitudinally juxtaposed semi-trailer units, each unit having a forward fifth wheel element adapted to cooperate for towing with a fifth wheel element of a towing vehicle, and each unit having a permanent rear running gear, the rear part of a forward one of said units and the forward part of a rearward one of said units having integrated rigid portions formed for longitudinal overlapping inter-fitting by relative longitudinal movement, to rigidly join the two units to form an effective single unit rigid in both vertical and horizontal planes, and the rear part of the forward one of said units carrying a fifth wheel element with which the fifth wheel element of the rearward unit is adapted to cooperate.

2. The combination defined in claim 1, and also including means for raising the forward end of the frame of the forward one of the two joined units on the towing vehicle, to raise the running gear of the forward unit off a roadway.

3. The combination defined in claim 1 and in which said raising means includes means for elevating the fifth wheel element on the towing vehicle.

4. The combination defined in claim 1, and including means for locking the forward and rear units longitudinally together by locking their said last mentioned fifth wheel elements together.

5. The combination defined in claim 1 which also includes means on the rear trailer unit mounting the forward fifth wheel element thereon for movement longitudinally of the rear unit between a rear position in which the said trailer units are in said overlapping, inter-fitting position and a forward position in which the said trailer units are out of said inter-fitting position, and means on the rear trailer unit locking the fifth wheel element thereon in either one of said two positions.

6. The combination of a plurality of longitudinally juxtaposed semi-trailer units, each unit having a forward fifth wheel element adapted to cooperate for towing with a fifth wheel element of a towing vehicle, and a rear unit having a permanent rear running gear, the rear part of a forward one of said units and the forward part of a rearward one of said units having integrated rigid portions formed for longitudinal overlapping inter-fitting by relative longitudinal movement, to rigidly join said units to form an effective single unit rigid in both vertical and horizontal planes, the rear part of the forward one of said units carrying a fifth wheel element with which the forward fifth wheel element of the rearward one of said units is adapted to cooperate, and means on the rear trailer unit mounting its forward fifth wheel element thereon for movement longitudinally of the rear unit between a rear position in which the said trailer units are in said overlapping, inter-fitting position and a forward position in which the said trailer units are out of said inter-fitting position, and means on the rear trailer unit locking its fifth wheel element thereon in either one of said two positions.

7. The combination defined in claim 6, and including means for locking the forward and rear units longitudinally together by locking their said cooperating fifth wheel elements together.

8. The combination defined in claim 6 and also including rails on each of the units adapted to be in longitudinal juxtaposition when the fifth wheel element on the rear unit is in rear position, and a running gear shiftable on said juxtaposed rails from a position under the rear unit to a position under the forward unit.

9. The combination of a plurality of longitudinally juxtaposed semi-trailer units, each unit having an underframe with a permanent rear running gear and a forward one of such units having a fifth wheel element adapted to cooperate for towing with a fifth wheel element of a towing vehicle, the rear part of a forward one of the under-frames of said units and the forward part of a rearward one of the under-frames of said units having integrated rigid portions formed for longitudinal overlapping inter-fitting by relative longitudinal movement, to rigidly join the two units to form an effective single unit rigid in both vertical and horizontal planes, and means for raising the forward end of the forward one of two joined units on the towing vehicle, to raise the running gear of the forward unit off a roadway.

10. The combination defined in claim 9 and in which said raising means includes means for elevating the fifth wheel element on the towing vehicle.

11. The combination defined in claim 9 that also includes, in combination, a plurality of cargo containers removably carried at least one by each of said under-frames, each said container having, on at least its end juxtaposed to an end of another container, integrated rigid endwise projecting formations adapted to be moved by relative longitudinal movement into mutual laterally overlapping relation, and means for registering said containers longitudinally and laterally on the respective under-frames of the two trailer units in positions to move their said end formations into overlapping relation when the two unit under-frames are moved into their rigidly jointed relation by relative longitudinal movement.

12. The combination defined in claim 11 and in which each of said containers has said endwise projecting mutually overlapping formations on each of its opposite ends, said formations being similar in location at two diagonally opposite end corners of each container and complementary to each other at the two corners of each end of each container.

13. The combination defined in claim 11 and including also means for locking the said overlapping container projections together against relative longitudinal movement.

14. The combination of a plurality of longitudinally juxtaposed semi-trailer units, each unit having an under-frame with an applicable rear running gear, and a forward one of said unit underframes having a forward fifth wheel element adapted to cooperate for towing with a fifth wheel element of a towing vehicle, the rear part of the frame of a forward one of said units and the forward part of the frame of a rearward one of said units having integrated rigid portions formed for longitudinal overlapping inter-fitting by relative longitudinal movement, to rigidly join the frames of said units to form an effective single frame rigid in both vertical and horizontal planes, a plurality of cargo containers removably carried at least one each by said unitary underframes, each said container having on at least one end mutually interfitting rigid integral formations, means for locking at least two of said containers together at their mutual interfitting formations to form an effective single unit of the two containers, and means for registering said two containers, respectively, on the under-frames of the two trailer units in positions to be moved into interfitting relation when the two trailer under-frames are joined rigidly by relative longitudinal movement.

15. The combination of claim 14 in which each of said containers has said mutually interfitting formations on each of two opposite ends.

16. The combination of claim 15 in which each of said containers has, on each of said two opposite ends, engageable formations for engagement by lifting tackle.

17. The combination defined in claim 14 in which the means for registering each container comprises a pair of longitudinally spaced, transversely extending bolsters on each trailer under-frame and a pair of similarly spaced inverted channels in the bottom of each container adapted to fit over the bolsters and register the container on the trailer frame.

18. The combination defined in claim 14 in which the means for registering each container comprises a plurality of spaced conical members on each trailer under-frame and a plurality of receiving cups on the bottom of each container adapted to fit over the conical members and register the containers on the trailer frames.

19. The combination defined in claim 18 that also includes pin means releasably connecting the receiving cups to the containers.

20. The combination defined in claim 18 in which the means for registering the containers also includes longitudinally extending tracks associated with the under-frames of each unit and forming effective continuous tracks when the two trailer units are joined, said conical members being slidable longitudinally of the trailers on said tracks; and pin means locking the conical members to the trailer under-frames at predetermined positions along the tracks.

21. The combination of a plurality of semi-trailer units, each unit having a frame with a forward fifth wheel element adapted to cooperate for towing with a tractor having a fifth wheel element and each unit frame having a rear unning gear, the rear part of the frame of a forward one of said units and the forward part of the frame of a rearward one of said units being formed for longitudinal overlapping inter-fitting by relative longitudinal movement to rigidly join the frames of said units to form an effective single rigid frame;

a plurality of cargo containers carried by the composite rigid trailer frame to be vertically removable therefrom;

a plurality of legs on each of the cargo containers adapted to support the respective containers independently of the trailer frames and movable out of supporting position;

and means carried by the composite trailer frame to lift the frame and containers thereon to permit movement of the legs into supporting position and subsequently to lower the trailer out of supporting engagement with the containers.

22. The combination defined in claim 21 in which each leg is mounted on a container to swing about a horizontal axis and is movable along said axis and laterally of the container to a load supporting position outwardly of the running gear of the trailer units.

23. The combination of a semi-trailer unit having a frame with a rear running gear and a forward fifth wheel element adapted to cooperate for towing with a towing vehicle having a fifth wheel element;

a cargo container carried by the trailer frame to be vertically removable therefrom;

a plurality of legs on the cargo container adapted to support the container independently of the trailer frame and movable out of load supporting position;

and means carried by the trailer unit frame to lift the frame and the container thereon to permit movement of the legs into load supporting position and subsequently to lower the trailer frame out of supporting engagement with the container.

References Cited in the file of this patent

UNITED STATES PATENTS

| | | |
|---|---|---|
| 2,126,819 | Schawlem | Aug. 16, 1938 |
| 2,425,948 | Lucien | Aug. 19, 1947 |
| 2,553,959 | Cook et al. | May 22, 1951 |
| 2,698,758 | Ronning | Jan. 4, 1955 |
| 2,761,581 | Cohee | Sept. 4, 1956 |
| 2,841,094 | Schumacker | July 1, 1958 |
| 2,847,137 | Stringfellow | Aug. 12, 1958 |
| 2,848,252 | Martin | Aug. 19, 1958 |
| 3,004,682 | Bertolini | Oct. 17, 1961 |
| 3,004,772 | Bohlen | Oct. 17, 1961 |
| 3,007,718 | Backof | Nov. 7, 1961 |
| 3,061,134 | Fesmire et al. | Oct. 30, 1962 |
| 3,070,386 | Gregg | Dec. 25, 1962 |

FOREIGN PATENTS

| | | |
|---|---|---|
| 204,405 | Austria | July 25, 1959 |
| 211,871 | Australia | June 14, 1956 |
| 602,737 | Germany | Sept. 15, 1934 |

UNITED STATES PATENT OFFICE

CERTIFICATE OF CORRECTION

Patent No. 3,163,306 December 29, 1964

Walter Bennett et al.

It is hereby certified that error appears in the above numbered patent requiring correction and that the said Letters Patent should read as corrected below.

Column 16, line 75, for the claim reference numeral "1" read -- 2 --.

Signed and sealed this 1st day of June 1965.

(SEAL)
Attest:

ERNEST W. SWIDER
Attesting Officer

EDWARD J. BRENNER
Commissioner of Patents